US008634033B2

(12) United States Patent
Vanderwall et al.

(10) Patent No.: US 8,634,033 B2
(45) Date of Patent: Jan. 21, 2014

(54) REMOTE DISPLAY REPRODUCTION SYSTEM AND METHOD

(75) Inventors: Philip J. Vanderwall, Marne, MI (US); Michael J. Sims, Zeeland, MI (US); Elisabet A. Anderson, Holland, MI (US); Richard J. Chutorash, Oakland Township, MI (US); Jeffrey N. Golden, Holland, MI (US); Rodger W. Eich, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 769 days.

(21) Appl. No.: 12/780,779

(22) Filed: May 14, 2010

(65) Prior Publication Data

US 2010/0220250 A1 Sep. 2, 2010

Related U.S. Application Data

(63) Continuation of application No. 12/519,737, filed as application No. PCT/US2007/088175 on Dec. 19, 2007, now abandoned.

(60) Provisional application No. 60/875,947, filed on Dec. 20, 2006, provisional application No. 60/875,946, filed on Dec. 20, 2006, provisional application No. 60/881,953, filed on Jan. 23, 2007, provisional application No. 61/005,419, filed on Dec. 5, 2007.

(51) Int. Cl.
*H04N 7/18* (2006.01)
(52) U.S. Cl.
USPC ............................................. 348/837; 348/836
(58) Field of Classification Search
USPC .................................. 348/142–160, 836–843
See application file for complete search history.

(56) References Cited

U.S. PATENT DOCUMENTS

| 4,390,877 A | 6/1983 | Curran |
| 4,760,394 A | 7/1988 | Takeuchi et al. |

(Continued)

FOREIGN PATENT DOCUMENTS

| EP | 0 660 542 A1 | 6/1995 |
| EP | 1 052 609 A1 | 11/2000 |

(Continued)

OTHER PUBLICATIONS

International Search Report and Written Opinion for International Patent Application No. PCT/US2008/085570, mailed Oct. 22, 2009, 17 pages.

(Continued)

*Primary Examiner* — Andy Rao
(74) *Attorney, Agent, or Firm* — Foley & Lardner LLP

(57) ABSTRACT

A system for mounting in a vehicle and for reproducing an image at least partially generated by a remote source and shown on a display of the remote source is provided. The system includes a display interface for providing a signal to the display. The system further includes a communications device for mounting in the vehicle and for communicating with the remote source, the communications device configured to receive the image from the remote source. The system yet further includes a processing system operatively coupled to the communications device and the display interface, the processing system configured to provide a representation of the image to the display interface. The system yet further includes a memory device communicably coupled to the processing system and including computer code for controlling the communications device so that the representation of the image provided to the display interface is updated to reflect new images generated and shown on the remote source.

24 Claims, 20 Drawing Sheets

(56) References Cited

U.S. PATENT DOCUMENTS

| | | | |
|---|---|---|---|
| 4,792,796 A | 12/1988 | Bradshaw et al. | |
| 4,825,200 A | 4/1989 | Evans et al. | |
| 4,827,520 A | 5/1989 | Zeinstra | |
| 5,113,182 A | 5/1992 | Suman et al. | |
| 5,278,547 A | 1/1994 | Suman et al. | |
| 5,475,366 A | 12/1995 | Van Lente et al. | |
| 5,479,155 A | 12/1995 | Zeinstra et al. | |
| 5,479,157 A | 12/1995 | Suman et al. | |
| 5,583,485 A | 12/1996 | Van Lente et al. | |
| 5,614,885 A | 3/1997 | Van Lente et al. | |
| 5,614,891 A | 3/1997 | Zeinstra et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,455 A | 8/1997 | Van Lente et al. | |
| 5,691,848 A | 11/1997 | Van Lente et al. | |
| 5,699,044 A | 12/1997 | Van Lente et al. | |
| 5,708,415 A | 1/1998 | Van Lente et al. | |
| 5,717,387 A | 2/1998 | Suman et al. | |
| 5,854,593 A | 12/1998 | Dykema et al. | |
| 5,903,226 A | 5/1999 | Suman et al. | |
| 5,907,796 A | 5/1999 | Matchett et al. | |
| 5,926,087 A | 7/1999 | Busch et al. | |
| 6,010,403 A | 1/2000 | Adam et al. | |
| 6,020,654 A | 2/2000 | Chutorash | |
| 6,028,537 A | 2/2000 | Suman et al. | |
| 6,067,681 A | 5/2000 | Zeinstra et al. | |
| 6,144,114 A | 11/2000 | Chutorash | |
| 6,154,148 A | 11/2000 | Fluharty et al. | |
| 6,181,255 B1 | 1/2001 | Crimmins et al. | |
| 6,188,889 B1 | 2/2001 | Tsai | |
| 6,212,474 B1 | 4/2001 | Fowler et al. | |
| 6,282,152 B1 | 8/2001 | Kurple | |
| 6,282,407 B1 | 8/2001 | Vega et al. | |
| 6,336,031 B1 | 1/2002 | Schyndel | |
| 6,374,182 B2 | 4/2002 | Bechtolsheim et al. | |
| 6,430,164 B1 | 8/2002 | Jones et al. | |
| 6,472,771 B1 | 10/2002 | Frese et al. | |
| 6,539,358 B1 | 3/2003 | Coon et al. | |
| 6,556,813 B2 | 4/2003 | Tsui | |
| 6,584,319 B1 | 6/2003 | Girod | |
| 6,603,405 B2 | 8/2003 | Smith | |
| 6,615,023 B1 | 9/2003 | Ehrensvard | |
| 6,771,749 B1 | 8/2004 | Bansal et al. | |
| 6,825,751 B1 | 11/2004 | Kita et al. | |
| 6,978,126 B1 | 12/2005 | Blaker et al. | |
| 7,050,593 B1 | 5/2006 | Emerling et al. | |
| 7,050,834 B2 | 5/2006 | Harwood et al. | |
| 7,110,537 B2 | 9/2006 | Mazzara, Jr. | |
| 7,116,229 B1 | 10/2006 | Miramontes | |
| 7,228,211 B1 | 6/2007 | Lowrey et al. | |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,516,072 B2 | 4/2009 | Campbell et al. | |
| 7,564,377 B2 | 7/2009 | Kimchi et al. | |
| 7,689,253 B2 | 3/2010 | Basir | |
| 7,787,907 B2 | 8/2010 | Zeinstra et al. | |
| 8,103,445 B2 | 1/2012 | Smith et al. | |
| 2001/0033225 A1 | 10/2001 | Razavi et al. | |
| 2002/0032510 A1 | 3/2002 | Turnbull et al. | |
| 2002/0040271 A1 | 4/2002 | Park et al. | |
| 2002/0054159 A1 | 5/2002 | Obradovich | |
| 2002/0123325 A1 | 9/2002 | Cooper | |
| 2002/0169584 A1 | 11/2002 | Fu et al. | |
| 2003/0079035 A1* | 4/2003 | Boyd et al. | 709/231 |
| 2003/0096593 A1 | 5/2003 | Naboulsi | |
| 2003/0114202 A1 | 6/2003 | Suh et al. | |
| 2003/0156097 A1* | 8/2003 | Kakihara et al. | 345/156 |
| 2003/0210796 A1 | 11/2003 | McCarty et al. | |
| 2003/0236818 A1 | 12/2003 | Bruner et al. | |
| 2004/0054468 A1 | 3/2004 | Yamada et al. | |
| 2004/0104842 A1 | 6/2004 | Drury et al. | |
| 2005/0005298 A1* | 1/2005 | Tranchina | 725/81 |
| 2005/0015197 A1 | 1/2005 | Ohtsuji et al. | |
| 2005/0024264 A1 | 2/2005 | Harrison | |
| 2005/0053008 A1 | 3/2005 | Griesing et al. | |
| 2005/0197747 A1 | 9/2005 | Rappaport et al. | |
| 2005/0208968 A1 | 9/2005 | Codeville | |
| 2005/0239434 A1* | 10/2005 | Marlowe | 455/345 |
| 2005/0242970 A1 | 11/2005 | Blaker et al. | |
| 2005/0245272 A1 | 11/2005 | Spaur et al. | |
| 2006/0129636 A1* | 6/2006 | Matsuura et al. | 709/203 |
| 2006/0135064 A1 | 6/2006 | Cho et al. | |
| 2006/0158344 A1 | 7/2006 | Bambini et al. | |
| 2006/0214813 A1 | 9/2006 | Witkowski et al. | |
| 2006/0232376 A1 | 10/2006 | Blaker | |
| 2006/0232377 A1 | 10/2006 | Witkowski | |
| 2007/0057810 A1 | 3/2007 | Bos et al. | |
| 2007/0123191 A1 | 5/2007 | Simpson | |
| 2007/0143798 A1* | 6/2007 | Jira et al. | 725/62 |
| 2007/0152798 A1 | 7/2007 | Witkowski | |
| 2007/0197172 A1 | 8/2007 | Witkowski et al. | |
| 2007/0210905 A1 | 9/2007 | Battista | |
| 2007/0213092 A1 | 9/2007 | Geelen | |
| 2008/0027643 A1 | 1/2008 | Basir et al. | |
| 2008/0068205 A1 | 3/2008 | Witkowski | |
| 2008/0192659 A1 | 8/2008 | Santavicca | |
| 2008/0221742 A1 | 9/2008 | DiCroce | |
| 2008/0244050 A1 | 10/2008 | Wong et al. | |
| 2009/0085728 A1 | 4/2009 | Catten et al. | |
| 2010/0100310 A1 | 4/2010 | Eich et al. | |

FOREIGN PATENT DOCUMENTS

| | | |
|---|---|---|
| EP | 1 052 609 B1 | 11/2000 |
| EP | 1 267 111 A1 | 12/2002 |
| EP | 1304695 A2 | 4/2003 |
| EP | 1338866 A2 | 8/2003 |
| EP | 1 357 358 A1 | 10/2003 |
| EP | 1 058 220 B1 | 2/2004 |
| EP | 1 387 145 A1 | 2/2004 |
| EP | 1493994 B1 | 1/2005 |
| EP | 1 568 834 A1 | 8/2005 |
| EP | 1655677 A2 | 5/2006 |
| EP | 1698518 A2 | 9/2006 |
| EP | 1 959 410 A1 | 8/2008 |
| EP | 1 560 200 B1 | 11/2008 |
| GB | 2 375 397 B | 5/2004 |
| JP | 01-290032 | 11/1989 |
| JP | 2001-297527 A | 10/2001 |
| JP | 2001-304875 A | 10/2001 |
| JP | 2002-087183 A | 3/2002 |
| JP | 2002-169584 A | 6/2002 |
| JP | 2002-171217 A | 6/2002 |
| JP | 2003-244343 A | 8/2003 |
| JP | 2003-304339 A | 10/2003 |
| JP | 2004-153660 A | 5/2004 |
| JP | 2005-236560 A | 9/2005 |
| JP | 2005-284886 A | 10/2005 |
| JP | 2006-033377 | 2/2006 |
| JP | 2006-321470 A | 11/2006 |
| JP | 2007-256137 | 10/2007 |
| WO | WO-00/75905 A1 | 12/2000 |
| WO | WO-01/67413 | 9/2001 |
| WO | WO-2004/043750 A2 | 5/2004 |
| WO | WO-2004/077729 A2 | 9/2004 |
| WO | WO-2005/002080 A1 | 1/2005 |
| WO | WO 2006/063602 A1 | 6/2006 |
| WO | WO 2007/123798 A1 | 11/2007 |
| WO | WO-2008/079811 A1 | 7/2008 |
| WO | WO 2008/079889 A2 | 7/2008 |
| WO | WO 2008/079891 | 7/2008 |
| WO | WO 2008/091727 A1 | 7/2008 |
| WO | WO 2009/073806 A2 | 6/2009 |

OTHER PUBLICATIONS

International Search Report and Written Opinion for International Application No. PCT/US2007/088175, mail date Sep. 19, 2008, 10 pages.

International Search Report and Written Opinion for International Patent Application No. PCT/US2008/050436, mailed Jun. 18, 2008, 9 pages.

(56) References Cited

OTHER PUBLICATIONS

MP3Car.com, MP3Car.com Wiki, http://www.mp3car.com, believed to be available by at least Jan. 12, 2007, 11 pages.
Dahn, et al., "Combinatorial Study of Sn1-xCox (0 < x < 0.6) and [Sn0.55Co0.45]1-yCy (0 < y < 0.5) Alloy Negative Electrode Materials for Li-Ion Batteries," Journal of Electrochemical Society, (2006), 153:A361-365.
http://en.wikipedia.org/wiki/Near_Field_Communication, Oct. 17, 2007, 6 pages.
International Search Report and Written Opinion for International Patent Application No. PCT/US2009/065855, dated Jun. 11, 2010.
Japan Office Action dated May 15, 2012 as received in corresponding Japan Application No. 2009-543188 and its English Translation, 7 pages.
Japan Office Action dated May 15, 2012 as received in corresponding Japan Application No. 2009-547339 and its English Translation.
Office Action for European Application No. 04751431.0, mail date Dec. 14, 2009, 5 pages.
Office Action for U.S. Appl. No. 10/558,121, dated Jan. 20, 2010, 9 pages.
Office Action for U.S. Appl. No. 10/558,121, dated Jul. 9, 2010, 11 pages.
Office Action in JP 2010-537078 dated Oct. 2, 2012.
Office Action in JP Appln No. 2009-543188 dated Nov. 6, 2012.
Office Action in U.S. Appl. No. 13/428,857 dated Oct. 16, 2012.
Office Action in U.S. Appl. No. 12/328,663 dated Apr. 26, 2012.
Office Action in U.S. Appl. No. 12/519,735 dated Jun. 13, 2012.
Office Action in U.S. Appl. No. 13/007,447 dated Aug. 27, 2012.
Office Action received for U.S. Appl. No. 12/328,663, dated Nov. 23, 2011, 13 pages.
Office Action U.S. Appl. No. 10/558,121 dated Apr. 11, 2012.
PCT Invitation to Pay Additional Fees and Partial International Search Report as received in PCT/US2009/065855, dated Mar. 19, 2010.
Written Opinion for International Patent Application No. PCT/US2004/017058, mailed Oct. 15, 2004.
Invitation to Pay Additional Fees and Communication Relating to the Results of the Partial International Search dated Jun. 12, 2009 as received in PCT/US2008/085570, 6 pages.
Office Action for U.S. Appl. No. 12/524,154, dated Oct. 11, 2011, 11 pages.
International Search Report and Written Opinion for Application No. PCT/US2007/088171, dated Jun. 27, 2008, 9 pages.
International Search Report and Written Opinion for Application No. PCT/US2007/088175, dated Sep. 19, 2008, 9 pages.
International Search Report and Written Opinion for Application No. PCT/US2008/050436, dated Jun. 18, 2008, 9 pages.
Office Action for European Patent Application No. 08705741, dated Jan. 13, 2010, 3 pages.
Office Action for European Patent Application No. 07869539.2, dated Jun. 25, 2010, 5 pages.
Office Action for European Patent Application No. 07869543.4, dated Dec. 22, 2010, 6 pages.
Office Action for European Patent Application No. 07869543.4, dated Oct. 14, 2009, 3 pages.
US Notice of Allowance received in connection with U.S. Appl. No. 13/007,447 Dtd Jan. 18, 2013.
US Office Action on U.S. Appl. No. 12/519,735 Dtd Jan. 10, 2013.
US Office Action on U.S. Appl. No. 13/428,857 Dtd Mar. 15, 2013.
Office Action for U.S. Appl. No. 13/428,857, mail date Jul. 30, 2013, 27 pages.
Office Action for U.S. Appl. No. 13/428,857, mail date Mar. 15, 2013, 27 pages.
Office Action for U.S. Appl. No. 12/519,735, mail date Jan. 10, 2013, 14 pages.

* cited by examiner

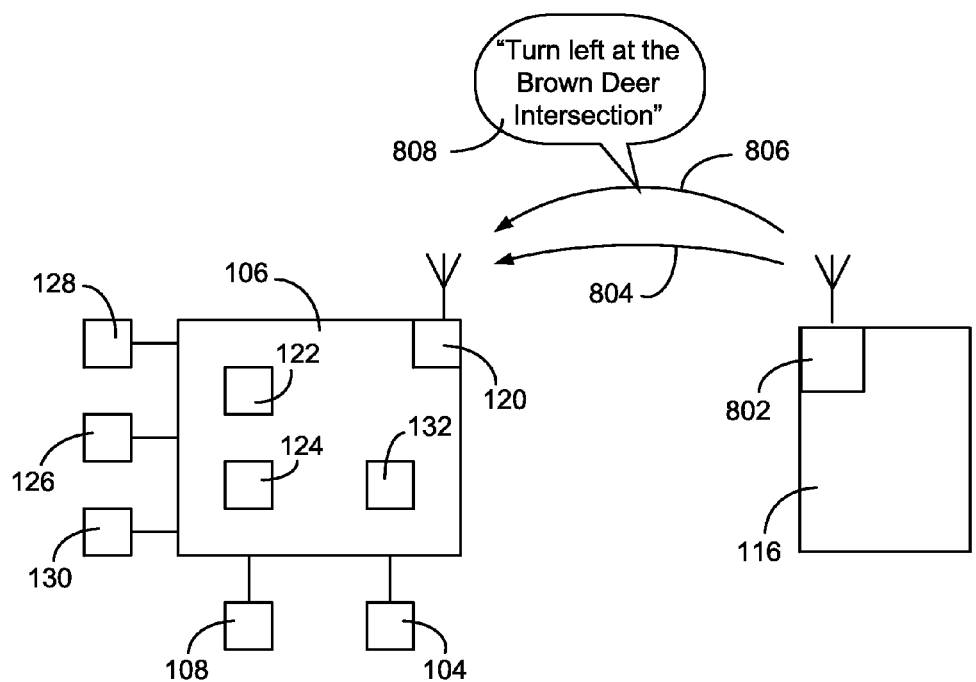
FIG. 8A
FIG. 8B
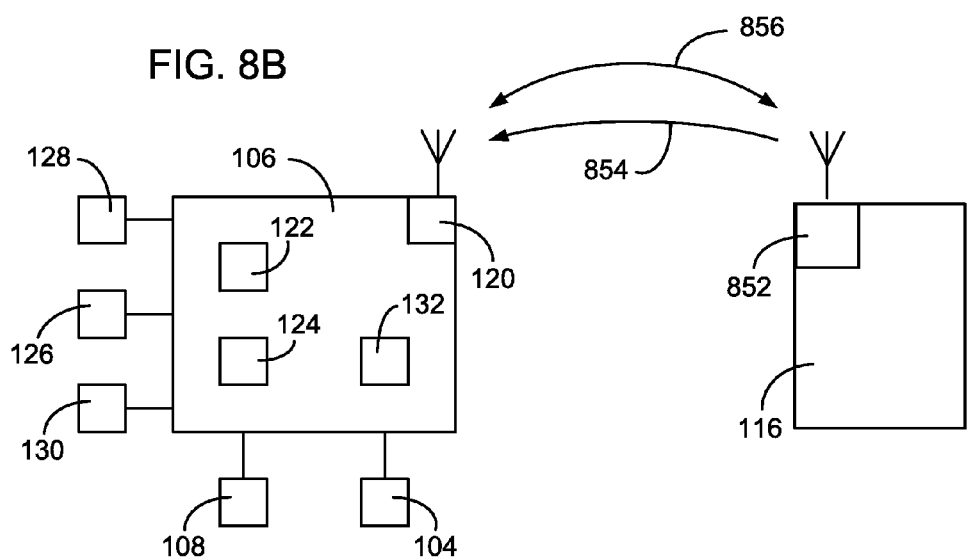

REMOTE DISPLAY REPRODUCTION SYSTEM AND METHOD

CROSS-REFERENCE TO RELATED PATENT APPLICATIONS

This application is a Continuation of U.S. application Ser. No. 12/519,737, which is a National Stage of International Application No. PCT/US2007/088175 filed Dec. 19, 2007, which claims the benefit of and priority to U.S. Provisional Patent Application No. 60/875,946 filed Dec. 20, 2006, U.S. Provisional Patent Application No. 60/875,947 filed Dec. 20, 2006, U.S. Provisional Patent Application No. 61/005,419 filed Dec. 5, 2007, and U.S. Provisional Patent Application No. 60/881,953 filed Jan. 23, 2007, the entire disclosures all of which are hereby incorporated by reference herein.

BACKGROUND

The present invention relates generally to the field of communication, navigation, and user control in a motor vehicle. The invention relates more specifically to systems and methods for display reproduction from a remote source to an in-vehicle display.

Vehicles typically include a number of electronics systems and subsystems such as an audio system, a mobile telephone system, a navigation system, an in-vehicle entertainment system, an engine management system that may be controlled by a user interface, an HVAC system, etc. One or more of these systems may include or be provided by an in-vehicle control system that may be setup in the vehicle. The control system may include a control interface and accompanying controls and may be configured to be coupled or integrated with other vehicle electronic systems, such as a display system or an audio system.

Conventional vehicles having control systems are usually relatively "stand-alone" in that they do not communicate well with other vehicle systems or remote systems. Some conventional vehicles having control systems may communicate with remote sources such as cellular telephones to enable various audio functions such as hands-free cellular communication. Typical in-vehicle control systems may also include visual output displays capable of providing images designed to make the in-vehicle control system more user friendly, useful, or enjoyable. Some typical in-vehicle control systems allow navigational information to be displayed on the visual output display. These systems typically generate the displayed information from an embedded system. Such systems often have a variety of drawbacks. For example, embedded systems with internally generated navigational information often require the use of stored navigational data (e.g., a navigational DVD, etc.). As roads change, users may need to purchase updates to the navigational data, or continue driving with outdated data. Similarly, the generating software or hardware may quickly become outdated. Thus, the utility of a conventional navigational system may decrease over time.

Typical "built-in" or embedded systems may suffer from these same problems outside of the realm of navigational data and software. For example, media players, e-mailing and text messaging communicators, home control systems, and any other control or entertainment system having visual elements may suffer from the problem of outdated data, software, or hardware. For example, a messaging feature of an in-vehicle control system may work properly when first developed, but a messaging protocol may change that renders the in-vehicle control system outdated. Similarly, popular media codecs (i.e., compression and decompression algorithms of music, video, and other media files, etc.) may change over time, sometimes quite rapidly. For many reasons, including convenience and cost, neither users nor original equipment manufacturers (OEMS) want to provide frequent software updates to in-vehicle control systems. Furthermore, as software and hardware features are added to in-vehicle control systems, design and production cost rises for OEMS, vehicle manufacturers, and, eventually, customers and drivers.

There is a need for an in-vehicle control system capable of displaying visual information from remote sources. Further, there is a need for an in-vehicle control system capable of displaying real-time, live, or frequently updating images from a remote source. There is a need for an in-vehicle control system or method capable of displaying bitmapped information generated on a remote source. Further, there is a need for an in-vehicle control system that provides systems and methods for receiving bitmaps from remote sources and displaying them on an in-vehicle output display.

It would be desirable to provide a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY

One exemplary embodiment relates to a system for mounting in a vehicle and for reproducing an image at least partially generated by a remote source and shown on a display of the remote source. The system includes a display interface for providing a signal to the display. The system further includes a communications device for mounting in the vehicle and for communicating with the remote source, the communications device configured to receive the image from the remote source. The system yet further includes a processing system operatively coupled to the communications device and the display interface, the processing system configured to provide a representation of the image to the display interface. The system yet further includes a memory device communicably coupled to the processing system and including computer code for controlling the communications device so that the representation of the image provided to the display interface is updated to reflect new images generated and shown on the remote source.

Another exemplary embodiment relates to a method for providing an image to an output display for mounting in a vehicle. The method includes establishing a communications link with a remote source and receiving a first image generated by a remote source. The image is a representation of a second image recently displayed on the remote source. The method further includes displaying the first image on an output display.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 8A is a block diagram illustrating an in-vehicle control system in communication with a remote source, the in-vehicle control system receiving image information and meta information, according to an exemplary embodiment;

FIG. 8B is a block diagram illustrating an in-vehicle control system in communication with a remote source, the in-vehicle control system receiving image information and sending and receiving user interface information, according to an exemplary embodiment;

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring generally to the FIGS., a vehicle control system is provided for reproducing or duplicating displayed generated and displayed on a remote source. The vehicle control system establishes a data connection (wired or wireless) with a remote source. The remote source will execute one or more applications. Images displayed on the remote source in conjunction with those applications will be sent to the vehicle control system. Once received by the vehicle control system, the images will be provided to a vehicle display system. In addition to images, one or more user interface features of the remote source will also be provided or made available to the vehicle control system. The vehicle control system may be configured to use vehicle user interface elements to command and control the one or more user interface features of the remote source.

Figure 1:
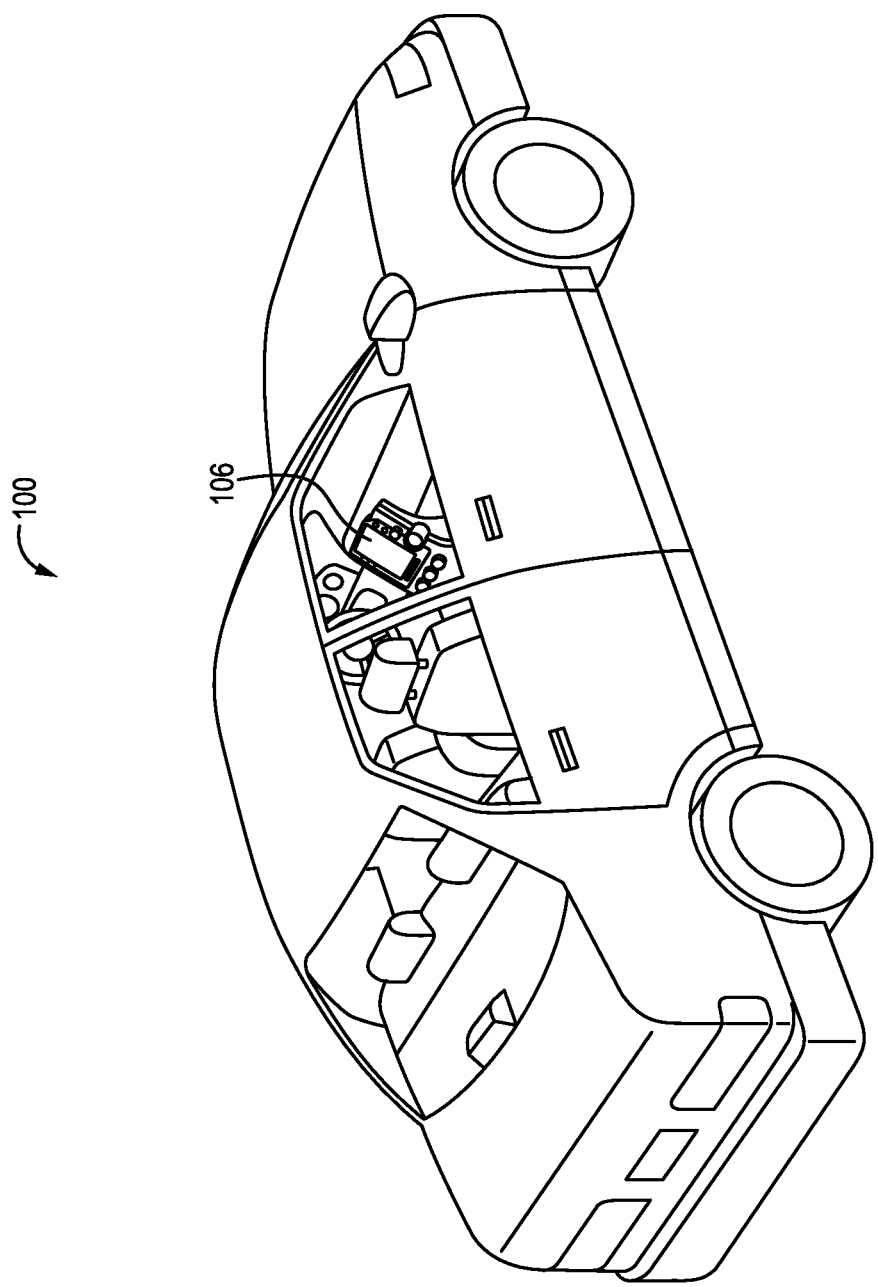
FIG. 1 is a perspective view of a motor vehicle that includes a number of vehicle systems, including an in-vehicle control system, according to one exemplary embodiment.

Referring to FIG. 1, a vehicle 100 includes a number of subsystems for user convenience and entertainment. Vehicle 100 generally includes a heating, ventilation, and air-conditioning (HVAC) system, a sound system, and an in-vehicle control system 106 (e.g., media system, navigational system, entertainment system, display system, communications systems, etc.). The HVAC system, sound system, display systems, and communications systems may be coupled to in-vehicle control system 106, which is capable of controlling and monitoring a variety of systems, automatically or by a manual user command. It is noted that in various exemplary embodiments, vehicle 100, the HVAC system, the sound system, and other vehicle systems may be of any past, present, or future design capable of interacting with in-vehicle control system 106.

Figure 2:
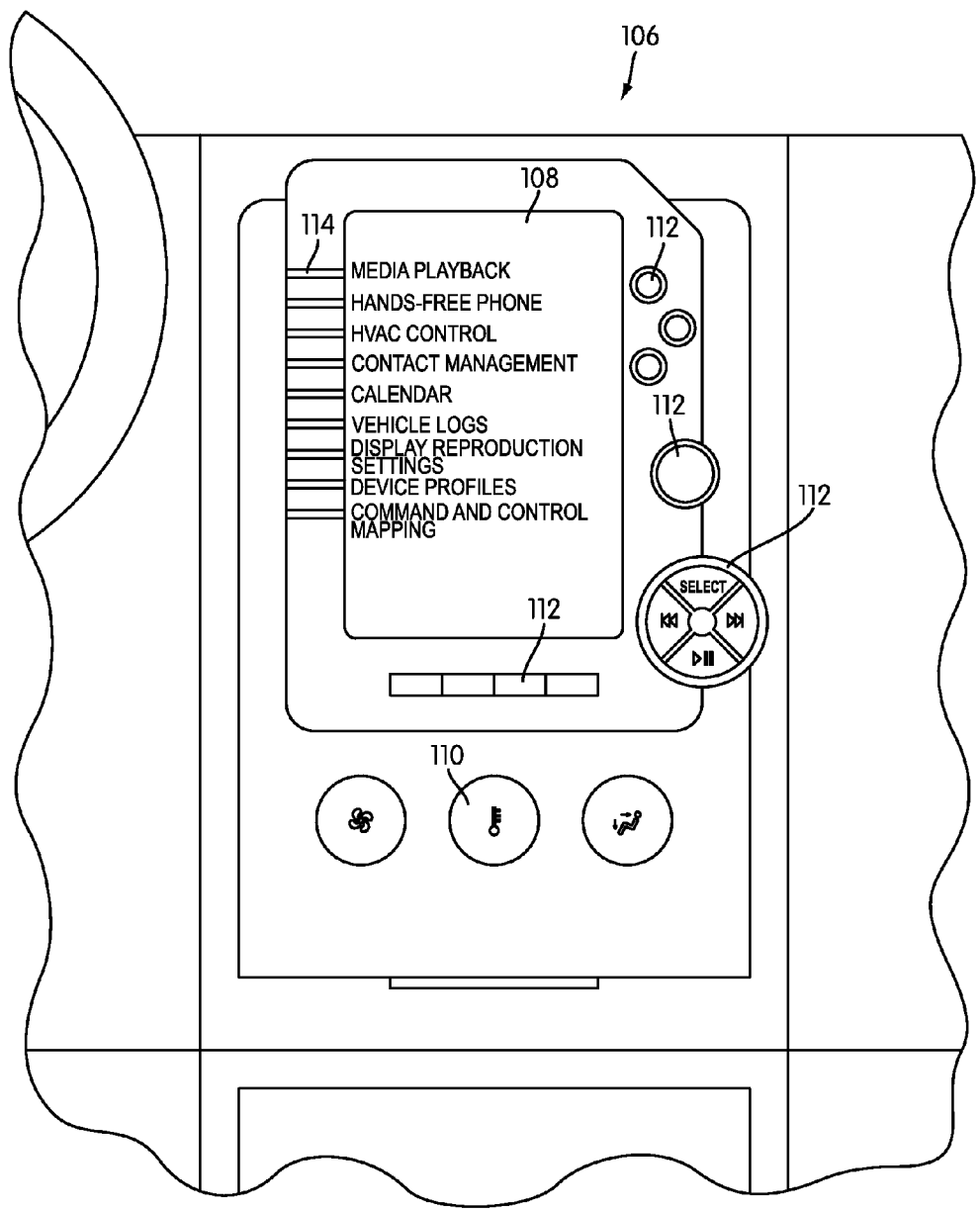
FIG. 2 is a front elevation view of the user interface of the in-vehicle control system of FIG. 1, according to an exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle and media functions. In one exemplary embodiment, output display 108 may be a touch-screen display, while in other exemplary embodiments, may be any other non-touch sensitive display. In still other exemplary embodiments, output display 108 may be of any technology (e.g., LCD, DLP, plasma, CRT), configuration (e.g., portrait or landscape), or shape (e.g., polygonal, curved, curvilinear). Output display 108 may be a manufacturer installed output display, an aftermarket output display, or an output display from any source. Output display 108 may be an embedded display (e.g., a display embedded in the control system or other vehicle systems, parts or structures), a standalone display (e.g., a portable display, a display mounted on a movable arm), or a display having any other configuration. Output Knobs 110 and pushbuttons 112 and 114 may be configured: (i) to control functions of the HVAC system such as fan speed, cabin temperature, por routing of air flow, (ii) to control playback of media files over the sound system, (iii) to control retrieval of phonebook entries, (iv) to control any other desired vehicle function, or to (v) control a function of a connected remote source. Pushbuttons 114 typically allow for the selection and display of various functions of in-vehicle control and media system 106 including HVAC system control, sound system control, media system control, display system control, communications system control, hands-free phone use, contract or address/phone book management, calendar viewing/modification, and vehicle data logging. Pushbuttons 114 may also allow for viewing and reconfiguration of display reproduction settings, device profiles, and/or command and control mapping.

The operation of pushbuttons 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allow the user to connect in-vehicle control system 106 to a mobile phone so that speaking into the vehicle console of in-vehicle control system 106 operates the mobile phone. The operation of pushbuttons 114 for HVAC control may display a menu screen or execute commands that allow the user to control cabin temperature and air flow by tactile or oral command. The operation of pushbuttons 114 for contact management may display a menu screen or execute commands that allow the user to view, list, select, sort, search for, edit, and/or dial one or more entries containing personal contact information, by use of a tactile or oral command. The operation of pushbuttons 114 for calendar management may display a menu screen or execute commands that allow the user to view, list, select, sort, search for, edit, and/or create one or more entries containing personal schedule information by tactile or oral command. The operation of pushbuttons 114 for vehicle log management may display a menu screen or execute commands that allow the user to input, view, select and/or reset information related to the vehicle operation (e.g., fuel economy, engine temperature, distance to empty, etc.) by tactile or oral command. The operation of pushbuttons 114 for communications control may display a menu screen or execute commands that allow the user to input, view, select, reset, set, or activate communications settings or communications modes by tactile or oral command. The operation of pushbuttons 114 for display reproduction control may display a menu screen or execute commands that allow the user to input, view, set, select, and/or change display profile settings or display settings such as color, resolution, size, language, tilt, or any other setting or variable by tactile or oral command. The operation of pushbuttons 114 for device profile control may display a menu screen or execute commands that allow the user to input, view, set, select and/or change profiles relating to remote devices that have connected to the system, are connected to the system, or may be connected to the system. The operation of pushbuttons 114 for command and control mapping may display a menu screen or execute commands that allow the user to input, view, set, select, and/or change the functions or commands associated with any pushbutton, touch screen element, joystick, scroll wheel, steering wheel mounted control, voice command, or other vehicle user interface (UI) element. For example, command and control mapping menu interfaces may be used to map vehicle UI elements to features or commands of a remote source.

Figure 3:
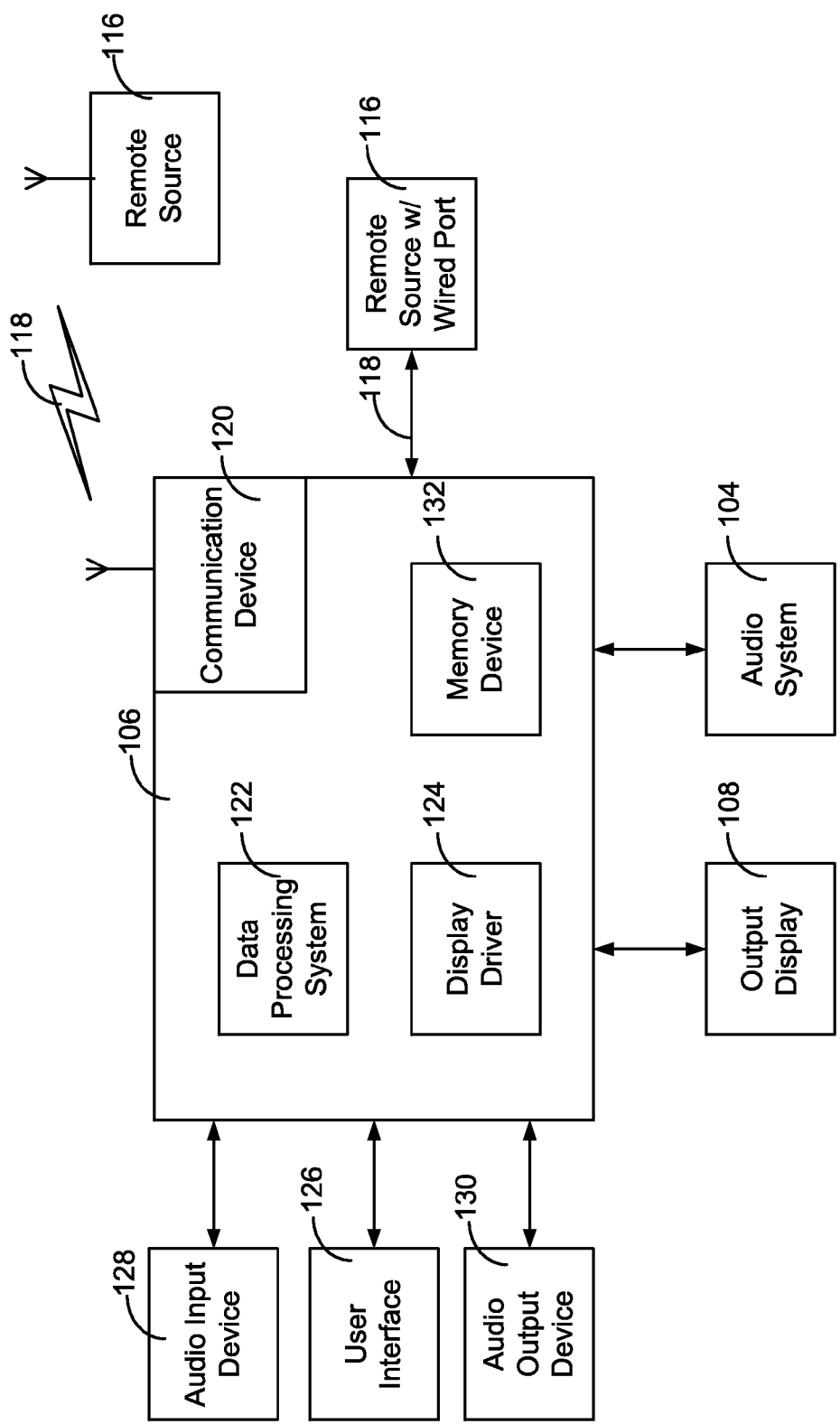
FIG. 3 is a block diagram of the in-vehicle control system of FIG. 1, according to an exemplary embodiment.

Referring to FIG. 3, in-vehicle control system 106 is capable of accessing data files from a remote source 116 over a communication link 118. For example, in-vehicle control system 106 may access media files, phonebook data files, calendar data, image data, or any other accessible data for use by in-vehicle control and media system 106. In-vehicle control system 106 may also send requests, receive files, send and receive commands, and send and/or receive any other type of data to and/or from a remote source 116 over a communications link 118.

In-vehicle control system 106 generally includes a communication device 120, a data processing system 122, a display driver 124, a user interface 126, an audio input device 128, an audio output device 130, an output display 108, and a memory device 132.

Communication device 120 is generally configured to establish communication link 118 with remote source 116. In one exemplary embodiment, in-vehicle control and media system 106 may establish a wireless communication link such as with Bluetooth communications protocol, an IEEE 802.11 protocol, an IEEE 802.16 protocol, a cellular signal, a Shared Wireless Access Protocol-Cord Access (SWAP-CA) protocol, a wireless USB protocol, or any other suitable wireless technology. In another exemplary embodiment, in-vehicle control and media system 106 may establish a wired communication link such as with USB technology, IEEE 1394 technology, optical technology, other serial or parallel port technology, or any other suitable wired link. Communication device 120 may receive one or more data files from remote source 116. In various exemplary embodiments, the data files may include text, numeric data, audio, video, program data, command data, information data, coordinate data, image data, streaming media, or any combination thereof.

Data processing system 122 is coupled to communications device 120 and is generally configured to control each function of in-vehicle control and media system 106. Data processing system 122 may facilitates speech recognition capabilities of in-vehicle control system 106 for the convenience of the user. Data processing system 122 may include digital or analog processing components and/or be of any past, present, or future design that facilitates control or features of in-vehicle control system 106. Data processing system 122 may be a single data processing device or multiple data processing devices. Data processing system 122 may be a data processing device having data processing sub-devices or components. Data processing system 122 may include any combination of program software and hardware capable of providing control, display, communications, input and output features to the vehicle. Data processing system 122 may coordinate the various devices, components and features of the in-vehicle control system (e.g., communications device 120, output display 108, display driver 124, memory device 132, audio system 104, user interface 126, audio input device 128, audio output device 130, etc).

Display driver 124 is coupled to output display 108 and is typically configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display. In another exemplary embodiment, display driver 124 may be configured to control output display 108 with touch-screen capabilities, while in other exemplary embodiments, display driver 124 may be configured to control display 108 without making use of touch-screen capabilities. Display driver 124 may include any number of functions, software or hardware, to facilitate the control and display of images on display 108. In still other exemplary embodiments, display driver 124 may be of any past, present, or future design that allows for the control of output display 108.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data input by remote source 116, data created by data processing system 122 that may be used later, intermediate data of use in current calculation or process, or any other data of use by in-vehicle control system 106.

Figure 4:
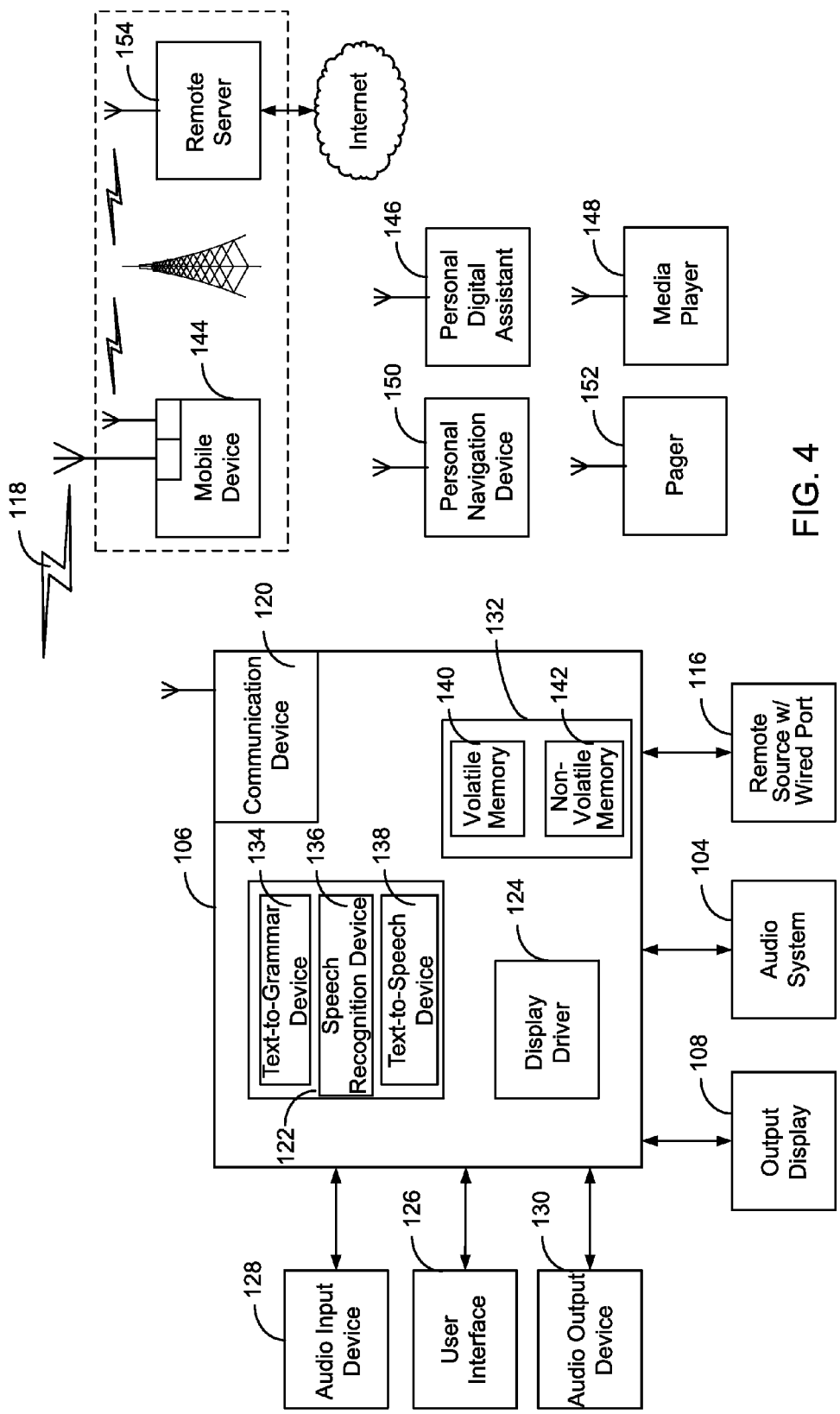
FIG. 4 is a more detailed embodiment and block diagram of the in-vehicle control system of FIG. 3, according to one exemplary embodiment.

Referring to FIG. 4, in-vehicle control system 106 and remote source 116 are shown in greater detail. Data processing system 122 may generally include a text-to-grammar device 134, a speech recognition device 136, and a text-to-speech device 138. Data processing system 122 may include any number of additional hardware modules, software modules, or processing devices (e.g., additional graphics processors, communications processors, etc.).

Text-to-grammar device 134 may be coupled to communications device 120 and is generally configured to generate a phonemic representation of the text and/or numeric data of each of the data files received by communications device 120 from remote source 116. The phonetic representation of the text and/or numeric data of each data file may be configured to facilitate speech recognition of each data file. After conversion of a data file to a phonetic representation, the data file may be accessed via an oral input command received by speech recognition device 136 via audio input device 128. According to an exemplary embodiment, text-to-grammar device 154 may be able to provide phonemic representations of information received from a remote source.

Speech recognition device 136 is typically configured to receive an oral input command from a user via audio input device 128. Speech recognition device compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response. According to an exemplary embodiment, speech recognition device 136 may be able to trigger or activate a display reproduction mode when certain commands are recognized. Furthermore, speech recognition device 136 may be able to pass commands to a remote device 116 to facilitate interactive control of a remote source via a communications link.

Text-to-speech device 138 is generally configured to convert the text and/or numeric data of each data file received from remote source 116 into an audible speech representation. This functionality may allow in-vehicle control system 106 to audibly give data to the user via audio output device 130 or the audio system 104. For example, in-vehicle control system 106 may repeat a user selected function back to the user, provide navigational information, announce directions, announce menu options, announce media file information, provide phonebook or contact information, or other information related to data stored in memory 132, remote source 116, remote server 154, etc. According to an exemplary embodiment, text-to-speech device 138 may be able to provide an audible speech representation of information received from a remote source.

Memory device 132 includes both a volatile memory 140 and a non-volatile memory 142. Volatile memory 140 may be configured so that the contents stored therein may be erased during each power cycle of the control system 106 or the vehicle 100. Non-volatile memory 142 may be configured so that the contents stored therein may be retained across power cycles, such that upon control system 106 power-up, data from previous system use remains available for the user. According to an exemplary embodiment non-volatile memory 142 may store one or more user profiles, display profiles, communications profiles, or any other type of user or system setting file.

According to an exemplary embodiment, remote source 116 may be any suitable remote source that includes a transceiver and is able to interface with in-vehicle control system 106 over communications link 118 (either wireless or wired). In various exemplary embodiments, remote source 116 may be one or more of a mobile phone 144, a personal digital assistant (PDA) 146, a media player 148, a personal navigation device (PND) 150, a pager 152, a remote server 154 that may be coupled to the Internet, or various other remote sources. Remote source 116 may have a storage device, one or more processing devices, and one or more communications devices. According to an exemplary embodiment, remote source 116 is a global positioning system capable remote source. According to various exemplary embodiments, remote source 116 may connect to the Internet or any other remote source with a first communications device while communicating with the control system using a second communications device.

Figure 5:
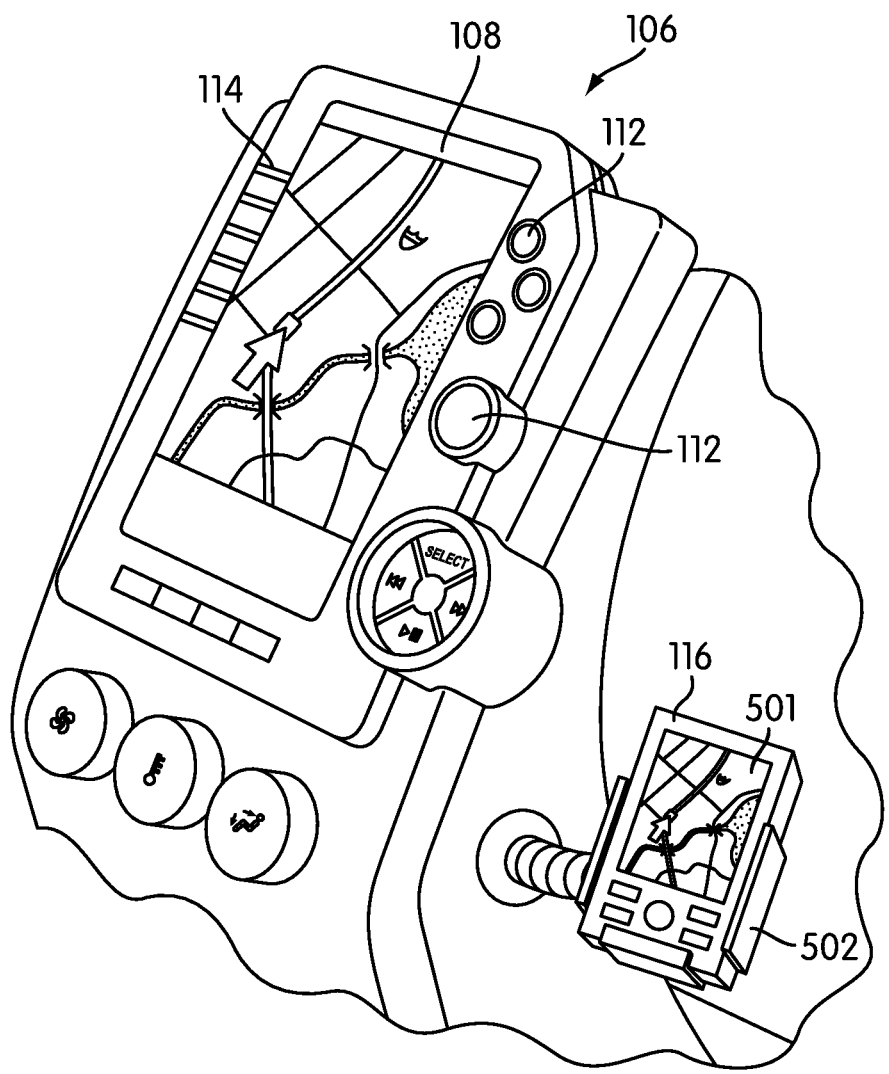
FIG. 5 is a perspective view of an in-vehicle control system duplicating the display of the remote source, according to an exemplary embodiment.

Referring to FIG. 5, according to an exemplary embodiment, in-vehicle control system 106 is shown replicating the display of remote source 116 on output display 108. Remote source 116 is shown as a PDA or PND resting in supporting arm 502, wherein in-vehicle control system 106 may be configured to communicate wirelessly with remote source 116. Remote source 116 may be a GPS-capable remote source configured to access navigational data and to use this navigational data to at least partially generate a image that may be shown on remote display 501. The in-vehicle control system 106 may establish a communications link with remote source 116, initiate a bitmap replication mode, receive bitmaps from remote source 116, and display the received bitmap on output display 108. According to various exemplary embodiments, remote source 116 is a remote source capable of generating (e.g., partially generating, completely generating or otherwise generating, etc.) graphics for output to its own display and communicating an image of the graphics displayed (e.g., recently displayed, currently displayed, or in the future displayed, etc.) to control system 106. The image may be any image, graphic, a raster graphic, bitmap, a vector graphic, a digital image, a data file or any other structure capable of representing a generally rectangular grid of image pixels. The images may be compressed and/or may be images of any variety of image file types. For example, the images may be JPEG files, JPG files, TIFF files, PDF files, GIF files, PND files, BMP files, and/or any files of the past, present or future capable of representing images that may be generated and displayed on an embedded display of a remote source.

According to an exemplary embodiment, remote source 116 may include any number of processes, software and/or hardware, to capture an image from its display system for transfer to in-vehicle control system 106. For example, remote source 116 may include a software program that extracts a image (e.g., screenshot, "screen dump", screen capture, etc.) of the information presently or recently displayed on the remote display 501. This software may operate in any number of ways including reading hardware devices of the remote source to extract the information (e.g., a memory device, display buffer, display driver buffer, display hardware, etc.) and/or using other software to extract the information (e.g., display driver software, operating system software, application software, etc.).

According to an exemplary embodiment, remote source 116 may also have communications software configured to facilitate the transfer of captured images from remote source 116 to in-vehicle control system 106. Communications software configured to facilitate the transfer of captured images may be integrated with the image capture software or may be relatively separate software. Software of remote source 116 and/or software of control system 106 may include any number of variables that a processing system may use to determine the operation of the image capture and transfer functions. For example, software loaded on remote source 116 may include software configured to utilize refresh rate variables (e.g., how often to capture images, how often to send images, etc.), capture variables (e.g., how much of the screen to capture, what resolution to capture at, etc.), and transfer variables (e.g., how often to transfer, how often to attempt to transfer, what meta information to include with the image transfer, whether to compress the image before transfer, etc.). These variables may be changed or edited using a user interface provided by remote source 116 or with a user interface provided by in-vehicle control system 106. For example, a user inside the vehicle may edit relevant communications and display variables with input devices 112, 114, a touch screen display 108, and/or with voice recognition. Relevant variable information may be stored within a memory device on remote source 116, within in-vehicle control system 106, or both. Variable information may be stored within either remote source 116 or in-vehicle control system 106 as profile information (e.g., within a display profile, a communications profile, etc.). Profile information may be stored in non-volatile memory (e.g., non-volatile memory 142 of FIG. 4, etc.) and may be recalled whenever in-vehicle control system 106 enters a display reproduction mode of operation.

It is important to note that the communications software and/or the image extracting software may be integrated with or added-onto application software running on the remote source. For example, the navigation software package of a remote source may be configured (via an add-on module or otherwise) to extract images and to communicate the images to a vehicle control system.

FIG. 5 further illustrates a supporting arm 502 according to an exemplary embodiment. Supporting arm 502 is illustrated as supporting remote source 116 via a flexible arm and a cradle apparatus. Supporting arm 502 and accompanying cradle may be a passive supporting arm and cradle (i.e., having only a holding or supporting function, etc.) or may be an active cradle or docking station (i.e., facilitating a wired and/or charging connection between the remote source 116 and the control system 106, etc.). According to various other exemplary embodiments, supporting arm 502 is not included or used with the system and remote source 116 may be physically located anywhere interior or exterior of vehicle 100. For example, remote source 116 may exist within the driver's pocket, in the driver's suitcase, on the seat, at a location exterior the vehicle, etc.

Figure 6A:
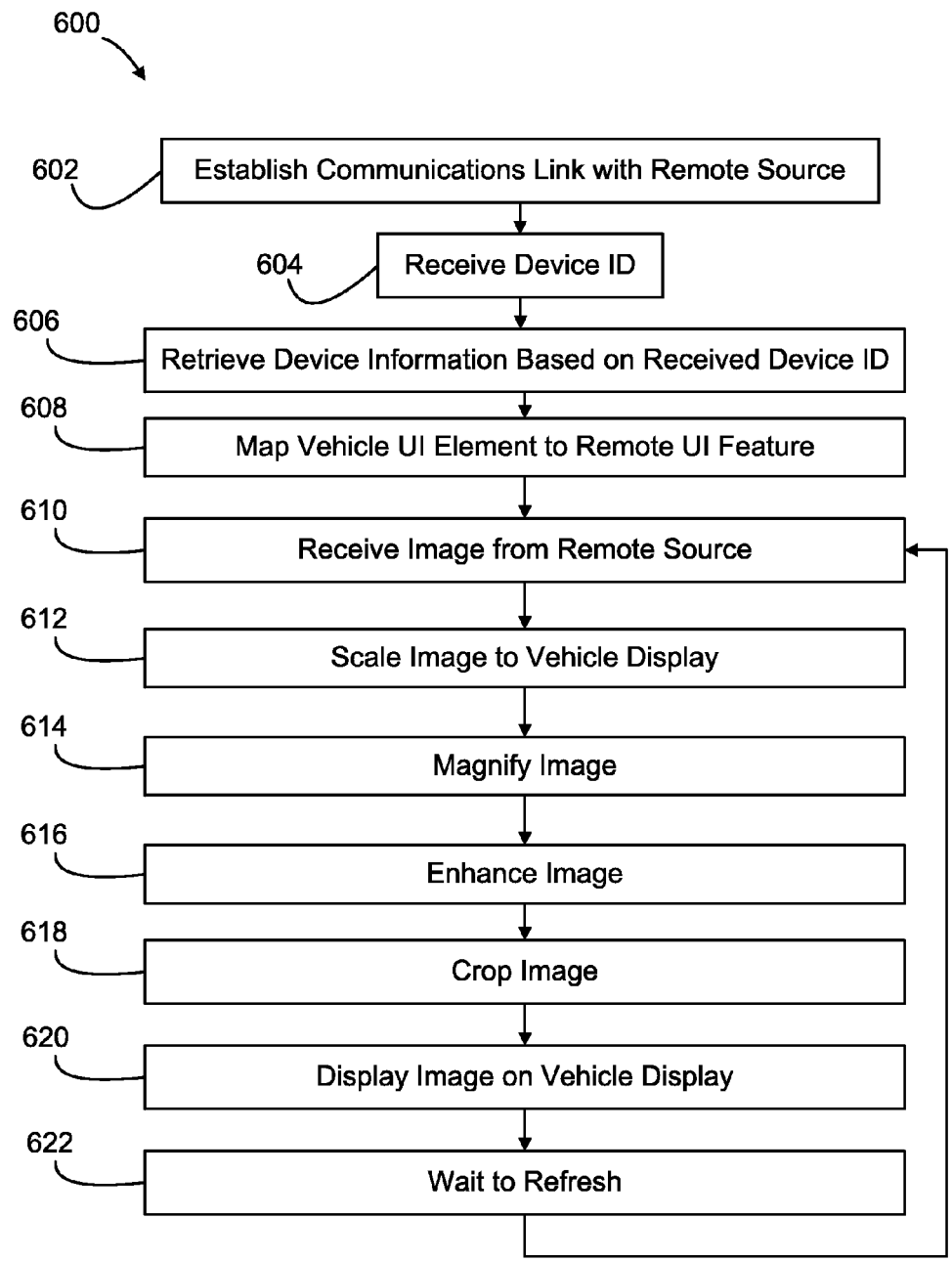
FIG. 6A is a flow chart of a process that may be used to display images received from a remote sources on a vehicle display, according to an exemplary embodiment.

Referring to FIG. 6A, a process 600 of displaying an image sent from a remote source to an in-vehicle display is shown, according to an exemplary embodiment. After any number of commands or other processes, the vehicle control system may establish a communications link with a remote source (step 602). This communications link may be established (i.e., process 600 may be triggered) due to any number of activating user inputs to the control system (i.e., input buttons, voice inputs, touch screen inputs, voice commands, etc.). It is important to note that the communications link may be any communications link a communications device of the control system and a communications device of the remote source are capable of forming (e.g., wireless, wired, IEEE 802.xx, BlueTooth, wireless USB, USB, cellular, etc.).

Referring further to FIG. 6A, once a communications link has been established between the control system and the remote source, the control system may receive a device identifier (ID) from the remote source (step 604). This reception may occur due to a protocol-based transfer or an automatic transfer. According to an exemplary embodiment, the control system sends a request signal to the remote source and the remote source responds by sending a device ID.

Once the control system receives the device ID, the control system may be configured to retrieve device information based on the received device ID (step 606). Device information may be stored in one or more memory devices, one or more tables, one or more databases, or another system for storing information. Device information may include, for example, a USB device class, a database of features, resolution of images generated by the device, information regarding authentication schemes, communications protocols, and the like.

Device information retrieved or received based on the device ID may be used for any number of activities. According to an exemplary embodiment, the device information is used to map a user interface element (e.g., button, switch, touch screen area, etc.) to a feature (such as a user interface feature) of the remote device (step 608).

Referring further to FIG. 6A, before, during, or after the activity of mapping a vehicle user interface (UI) element to a remote UI feature, the vehicle control system may begin receiving images from a remote source (step 610). Once received, the vehicle control system may conduct a number of processing tasks on the received image. For example, the image may be scaled to a new size and/or resolution for viewing on the vehicle display system (step 612). The image may be magnified (step 614) (e.g., zoomed in, zoomed out, stretched, distorted, etc.). The image may be enhanced (e.g., sharpened, brightened, contrast-increased, outlined, etc.)

(step 616) and/or cropped (step 618). The image may then be displayed on the vehicle display (step 620). After waiting some period of time (step 622), a new image may be received from the remote source and the display may be refreshed. It is important to note that any of the processing tasks (e.g., scaling, cropping, enhancing, magnifying, etc.) may be conducted on the entire image received from the remote source, a portion of the image received from the remote source, multiple images received from the remote source, a derivative of the image received from the remote source, or otherwise. Waiting to refresh may include waiting for subsequent images to be "pushed" to the control system by the remote source or may include sending an image request from the vehicle control system to the remote source. Waiting to refresh may include sending a refresh request on a regular interval from the control system to the remote source. The loop of waiting to receive an image, receiving an image, and displaying the image may continue until a user ends the display reproduction mode or the communications connection is otherwise terminated.

It is important to note that the images (e.g., bitmaps) may be images that were stored on the remote source, images partially generated by the remote source, images entirely generated by the remote source, and/or images that were at least partially generated by third-party sources (e.g., an Internet server, a navigational source, etc.). According to an exemplary embodiment, the images are partially or entirely generated by the remote source and are presently displayed (or were recently displayed) on the remote source's display when the transmission of the image to the vehicle control system occurs.

Figure 6B:
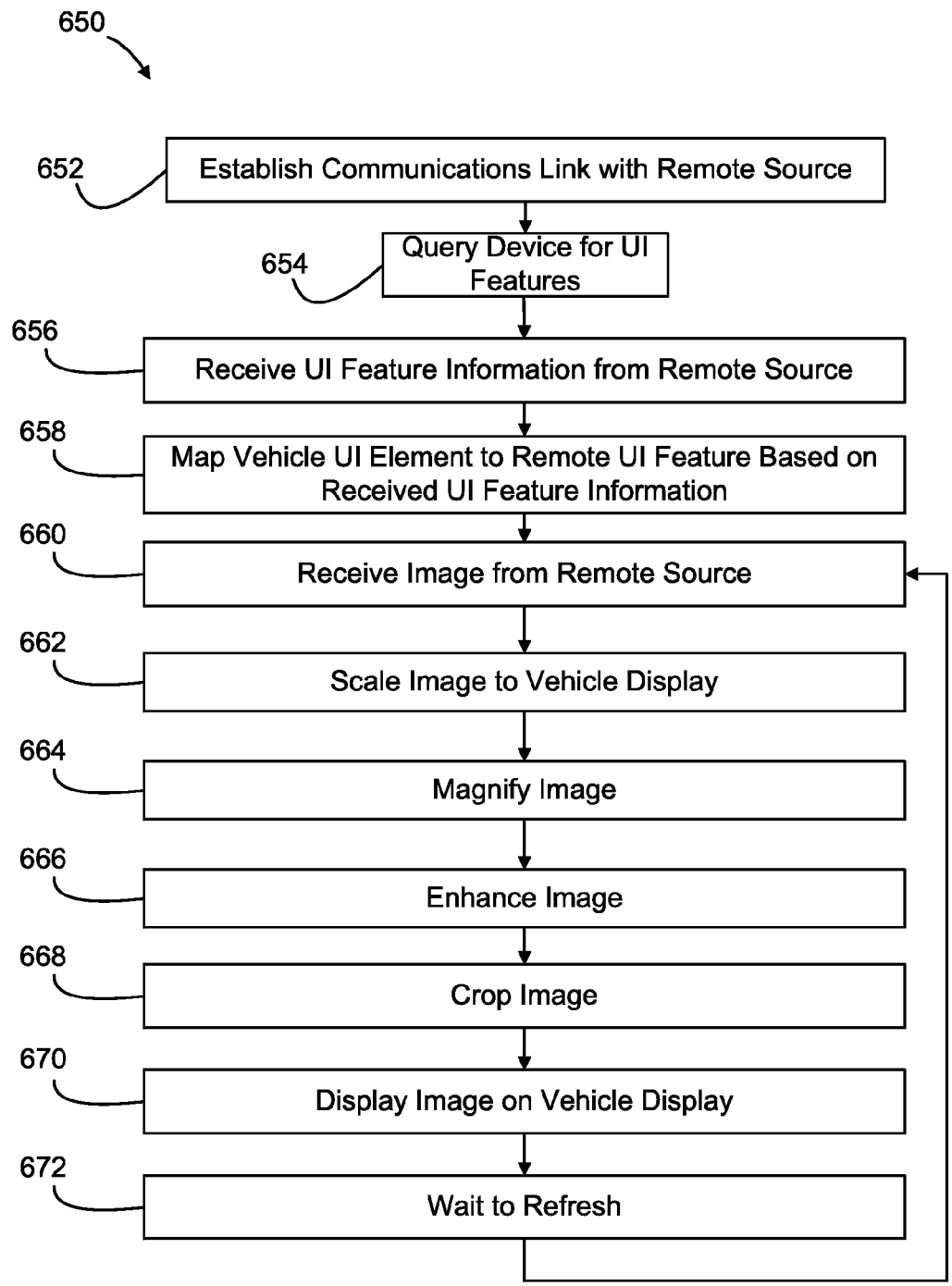
FIG. 6B is a flow chart of a process that may be used to display images received from a remote sources on a vehicle display, according to another exemplary embodiment.

Referring now to FIG. 6B, a process 650 for displaying images from a remote source on a vehicle display system is shown, according to an exemplary embodiment. Once a communications link has been established with the remote source (step 652), the process includes querying the remote source for UI features (step 654). Querying may include sending a request to the remote source for information regarding all UI features of the remote source. Querying may also include sending a request to the remote source for information regarding a particular UI feature of interest, a set of UI features, a class of the device, or otherwise. The process further includes receiving UI feature information from the remote source (step 656). UI feature information could be a functional definition, a feature identifier, one or more bits representing features that the remote source includes or does not include, a list of features, a document describing the features, an XML document describing the features, etc.

Referring further to FIG. 6B, using UI feature information received from the remote source, the vehicle control system may be configured to map a vehicle UI element to a remote UI feature (step 658). Mapping may include associating a UI element identifier with a function identifier, a command identifier, a control signal identifier, a parameter for providing to a function, a parameter for sending, or the like. Associations of UI elements to UI features may be stored in a database, table, list, XML document, or any other data structure or data file. Mapping may include adding a new record, updating a record, deleting an old record, adding an entry or line, or conducting any other activity that may be used to update a data structure or data file with updated UI element to UI feature information.

Before, during, or after the querying, receiving, and/or mapping steps relating to remote source UI features, the vehicle control system might also receive an image from the remote source (step 660), scale the image to the vehicle display (step 662), magnify the image (step 664), enhance the image (step 666), crop the image (step 668), and/or display the image on the vehicle display (step 670). The system may wait a period of time (step 672) before looping back to step 660 or otherwise.

Figure 7:
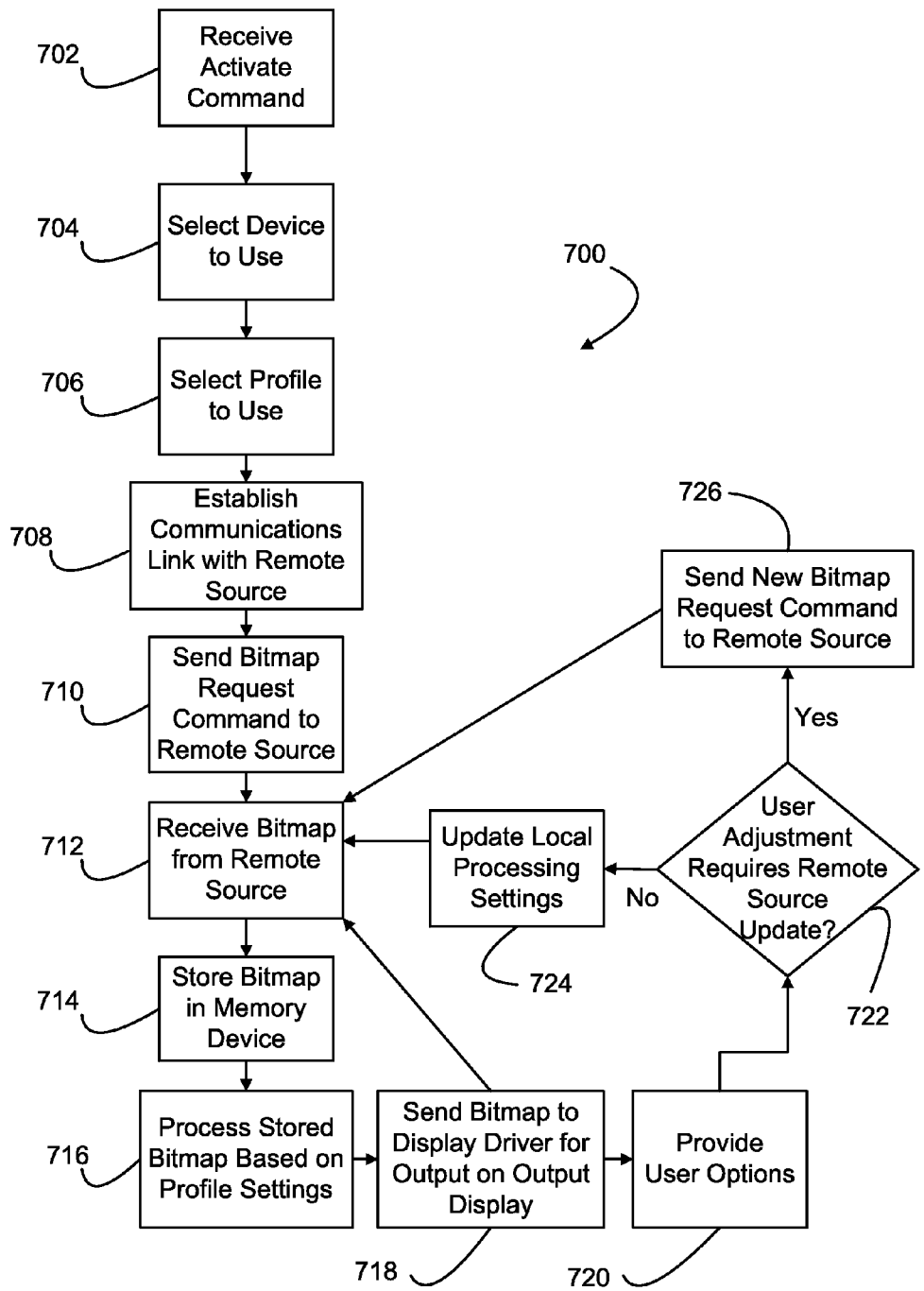
FIG. 7 is a flow chart of a process that may be used to display bitmaps of remote sources on a vehicle display, according to another exemplary embodiment.

Referring to FIG. 7, a detailed process 700 of displaying an image sent from a remote source on an in-vehicle display is shown, according to an exemplary embodiment. A "display replication" or "display reproduction" mode of operation may be activated by a user activation command that may be received by the control system (step 702). The activation command may be created by a user input device, a touch screen, a voice recognition device, or by any other device capable of accepting user input. According to various alternative embodiments, the activation command (and accompanying control commands) may be sent from the remote source rather than the control system. Once an activate command has been received, the control system may prompt the user, requiring, for example, the user to select which device display the control system should reproduce (step 704). This step may or may not happen based on the presence or absence of more than one capable remote source within communications range. The control system may also prompt the user for a selection of a display profile (step 706). The user may select a display profile or a default or standard profile may be chosen (e.g., after a timeout on the user selection, etc.). A communications link may be established between the control system and the remote source (step 708). Once a communications link has been established, the control system may send an image request command to the remote source (step 710). An image request command may be implicit or bundled with communications used to establish the communications link, or the image request may be a separate request sent over the communications link. The control system may then receive an image from the remote source (step 712). This received image may be stored in a memory device coupled to the components of the control system (step 714). The control system may then process the received and stored image using a processing system of the control system (step 716). This processing may be based on display reproduction profile settings, the physical attributes of the output display, user input, or may be automatic processing. The processing may include scaling, rotating, cropping, zooming, decompressing, and/or any other image editing function. According an alternative embodiment, some amount of processing may occur on the remote source prior to transfer to the control system. After processing, the control system may then send the resulting image to the control system's display driver for output on the control system's output display (step 718). This transmission may cause the image to be displayed on the output display. After a first image has been displayed on the output display of the control system, the system may provide user options that allow the user to adjust the way the image is displayed on the output device (step 720). The control system may check to determine whether the user adjustment requires an update of settings on the remote source (step 722). If the adjustment does not require a remote source settings update, then the control system may update local processing or display profile settings (step 724). If the adjustment requires a remote source settings update, then the control system may send a new image request command to the remote source (step 726) containing updated command information. According to various alternative embodiments, a separate communications may contain the remote source settings update. The remote source may be instructed to update a display profile (or other profile) stored on the remote source. Regardless of whether the user chooses not to use the user options or chooses user options of a local updating or remote updating type, the control system may continue sending image requests and/or receiving images from the remote source (step 712).

New image requests and/or receiving new images from the remote source may include requesting or receiving a different or new image when a predetermined period of time has elapsed. For example, new images may be sent from the remote source to the control system every five seconds to update or refresh the image displayed on the control system's output display. According to various other exemplary embodiments, new images may be streamed or pushed from the remote source to the control system at some irregular rate depending on communications conditions or communications content. For example, new images may be requested and sent as the vehicle reaches certain points along a navigational route. When the vehicle is standing still, for example, the control system may determine that it is not necessary to request a new or updated image from the remote source. This determination may also be made on the remote source. According to other exemplary embodiments, any number of communications decisions may be made based on sensed data communications conditions. For example if the data throughput is determined to be low, the remote source or the control system may select a reduced new image transfer rate.

Referring to FIG. 8A, a block diagram is shown which illustrates the remote source 116 not only sending an image or image data 804 to the control system 106, but also sending meta information 806 to describe or supplement the image. Control system 106 may use the received meta information 806 to perform an output task in addition to displaying the received image. Meta information 806 may be stored in memory device 132 when it is received. Following reception, data processing system 122 may process meta information 806 to perform the output task. The output task may be a wide variety of output tasks, including display output tasks and audio output tasks. Meta information 806 may be graphical, textural, aural, or be in the form of instructions, image or bitmap coordinates, program code or instructions to be parsed, function inputs, or any other form that may be processed, read, output or stored to supplement the display of the received bitmaps. For example, meta information 806 may be an instruction to display a navigational aide graphic, a navigational aide or overlay graphic itself, computer instructions to generate aural navigational instructions, code to generate directional indicators, etc. Meta information 806 may be any data or information capable of supplementing the bitmap. Meta information 806 may be sent separately (as illustrated in FIG. 8A) from the bitmap data 804 or embedded or otherwise included with the bitmap. Meta information 806 sent from remote source 116 and received at in-vehicle control system 106 may also be processed or converted into any other type of information, data, or output. For example, speech information sent from remote source 116 via communications device 802 to in-vehicle control system 106 may be converted into bitmap information that may be shown on output display 108 of in-vehicle control system 106. According to one exemplary embodiment, a PND may be configured to connect to in-vehicle control system 106 using Bluetooth and to send Bluetooth data including streamed voice instructions to in-vehicle control system 106. In-vehicle control system 106 (and its processing components) may be configured to convert these received streamed voice instructions into bitmap data to be shown on the display. For example, the PND may send the streamed voice instructions of: "turn right on 100th street" to in-vehicle control system 106 and in-vehicle control system 106 may then be able to convert these instructions into an arrow indicating a right turn on 100th street for overlay and/or other display on output display 108 of in-vehicle control system 106.

A display output task might be a task of overlaying a display object on top of a received bitmap while it is displayed on output display 108. For example, a directional arrow graphic may be overlaid on a map displayed on output display 108. This feature may allow in-vehicle control system 106 to add, remove, change the size, shape, color, or any other parameter of the arrow. This flexibility might be desirable to accommodate various user preferences, rather than accepting the icons or directional arrows that might have otherwise been embedded into a transferred bitmap. In addition to "user preference" type options, overlaying graphics on the received bitmap may help reduce the need to refresh the bitmap itself as often. For example, rather than refreshing a bitmap showing a map on a regular basis, the remote source 106 could send updated bitmap coordinates (e.g., <x,y>, etc.) for the arrow as meta information 806 independent of the bitmap. When used in this manner, the arrow may be refreshed using very small amounts of communicated data (utilizing a small amount of bandwidth) a number of times before the bitmap itself may need to be refreshed. This may allow the user to experience a smooth display that may look and feel as if the bitmap itself is updating faster. A display output task may also include sending directional text (e.g., "turn left on Main Street," etc.) to a vehicle display. According to various exemplary embodiments, the display output task may be any number of display output tasks such as sending display information to a second in-vehicle display embedded in the dash, activating display elements such as light emitting diodes, prompting the user for input, warning the user of hazards ahead, etc.

An audio output task might be a task that activates or uses audio system 104 or audio output device 130 to communicate with the vehicle passengers. For example, meta information 806 sent with the bitmap may instruct control system 106 to provide aural output such as "Turn left at the Brown Deer Intersection." It is important to note that meta information 806 driving the audio output task may be of any form or type. For example, meta information 806 could be an actual audio file of digital audio information or audio files or audio generation mechanisms could reside on control system 106 and meta information 806 may simply command data processing system 122 of control system 106 to generate specific audio outputs or to play certain stored audio files. According to various exemplary embodiments, control system 106 may have an array of stock audio files stored within memory device 132. These audio files may be generic enough that a small amount of meta information 806 may be used to trigger the stored audio files. For example, a simple command of "L, 500" sent as meta information 806 may processed and used to trigger or generate the audio "Turn Left in 500 feet." According to various other exemplary embodiments, portions of a single audio output task may be pre-generated or stored while other portions are sent for new or on-demand generation.

Referring to FIG. 8B, remote source 116 may be a mobile phone having a communications device 852. Remote source 116 and/or communications device 852 may be configured to send image data 854 from the mobile phone to communications device 120. Remote source 116 and/or communications device 852 may also be configured to send and/or receive phone information 856 (e.g., phone UI information, phone book information, text message information, e-mail information, GPS information, GPS coordinates, dialing information, UI commands, etc.) to and/or from control system 106. According to an exemplary embodiment, communications devices 120 and 852 are Bluetooth® compatible devices, near field communications devices, WiFi communications devices, or any other wireless device. According to other exemplary embodiments, communications devices 120 and 852 are wired communications interfaces (e.g., USB interfaces).

Figure 9:
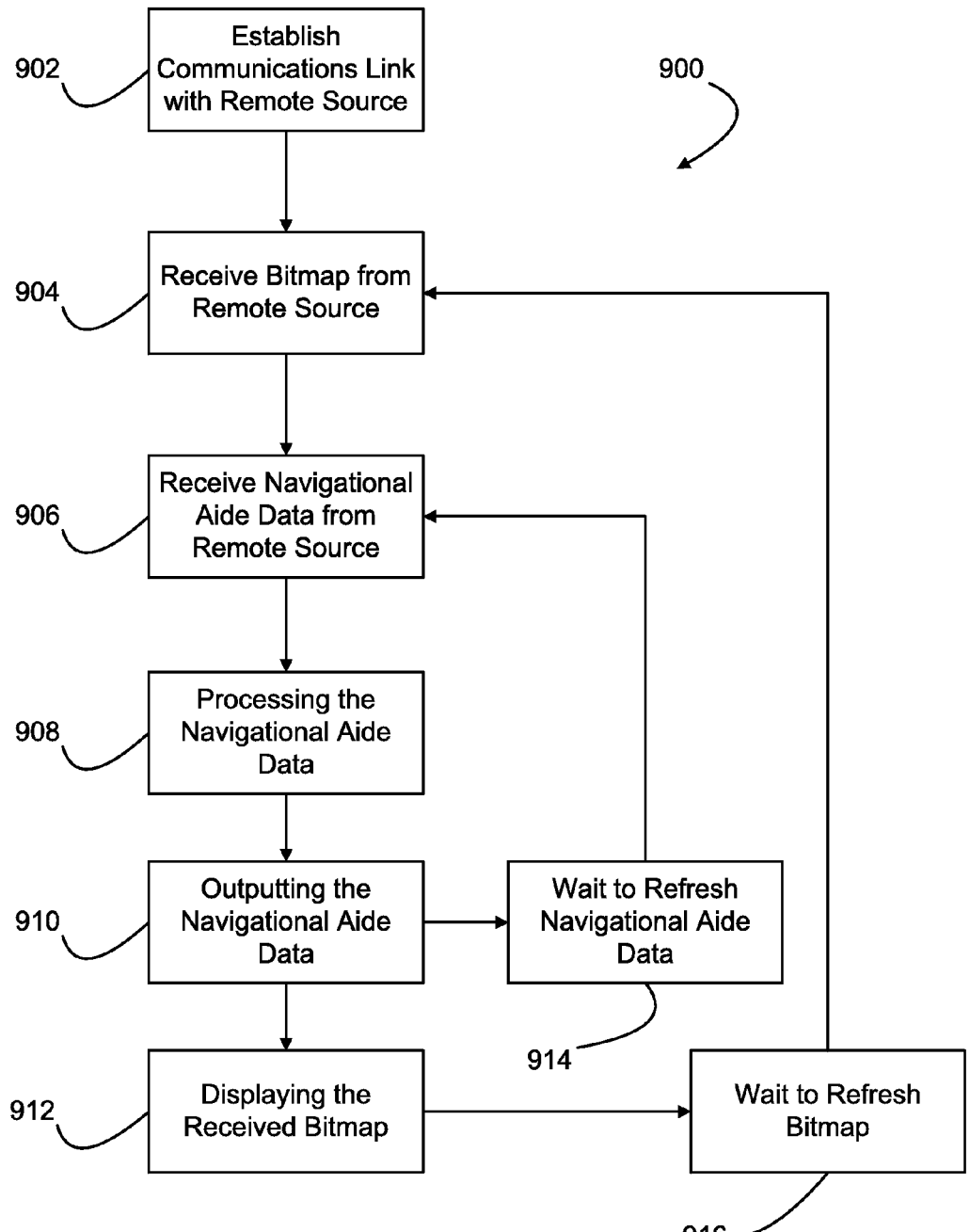
FIG. 9 is a flow chart of a process that the in-vehicle control system may use to output meta information regarding the received image, according to an exemplary embodiment.

Referring to FIG. 9, a process 900 is shown for displaying navigational graphics on an output display of a vehicle. The in-vehicle control system may establish a communications link with the remote source (step 902) before receiving an image from the remote source (step 904). The in-vehicle control system may also receive navigational aide data from the remote source (step 906). This navigational aide data may be processed (step 908) by the data processing system of the in-vehicle control system. The processing of the navigational aide data may result in outputting the navigational aide data (step 910). The in-vehicle control system may then display the received image (step 912). Once navigational aide data has been output, the in-vehicle control system may wait some period of time (step 914) to refresh the navigational aide data. Once this period of time has elapsed the in-vehicle control system may receive additional navigational aide data from the remote source (step 906). After the image has been displayed, the in-vehicle control system may wait some period of time to refresh the image (step 916). Once this period of time has elapsed, the in-vehicle control system may receive an additional image or images from the remote source (step 904). It is important to note that the refresh rates of the navigational aide data and the image might vary and/or the order of transmission be reversed. In some situations it may be desirable to refresh the image earlier or faster than the navigational aide data. In other situations it may be desirable to refresh the navigational aide data earlier or faster than the image. For example, it may be desirable to update the navigational aide data (which may be data to update a navigational arrow overlay) at some multiple faster than the image is refreshed (e.g., it may be desirable to update a directional indicator overlay five times for every underlying map image received, etc.).

Figure 10A:
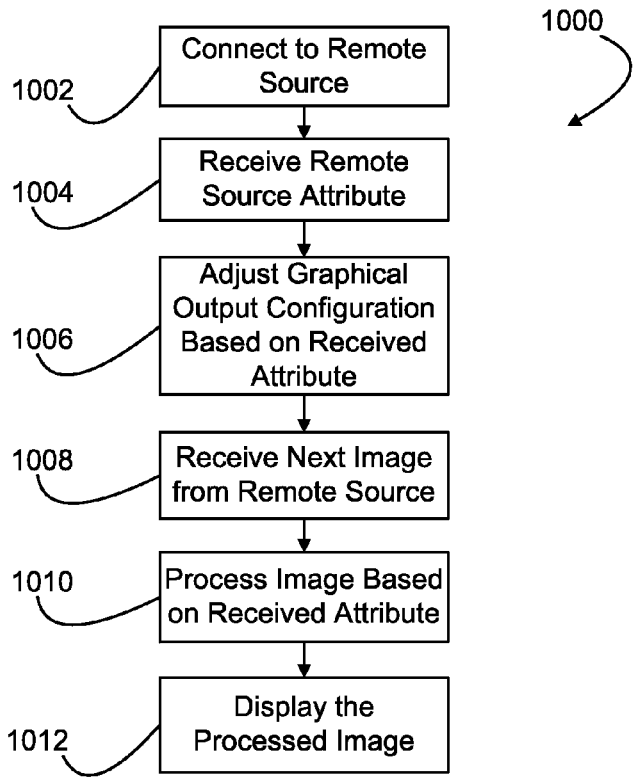
FIG. 10A is a flow chart of a process that the in-vehicle control system may use to display an image received from a remote source, according to an exemplary embodiment.

Referring now to FIG. 10A, a process 1000 is shown for displaying images from a remote source on a vehicle control system, according to an exemplary embodiment. After a connection to a remote source has been made (step 1002), the vehicle control system may receive an attribute relating to the remote source (step 1004). This reception may be a part of an attribute exchange protocol, process, or software algorithm. The attribute may be or may represent a generated image size, an image resolution, a screen size of the remote source, an image identifier, an image descriptor, or similar. Based on the received attribute, the control system may be configured to adjust or configure the graphical output provided to a connected display system (step 1006). As images are received from the remote source (step 1008) the images may be processed based on the received attribute (step 1010). Received and/or processed images are provided to a vehicle display system (or vehicle display system interface) (step 1012).

Figure 10B:
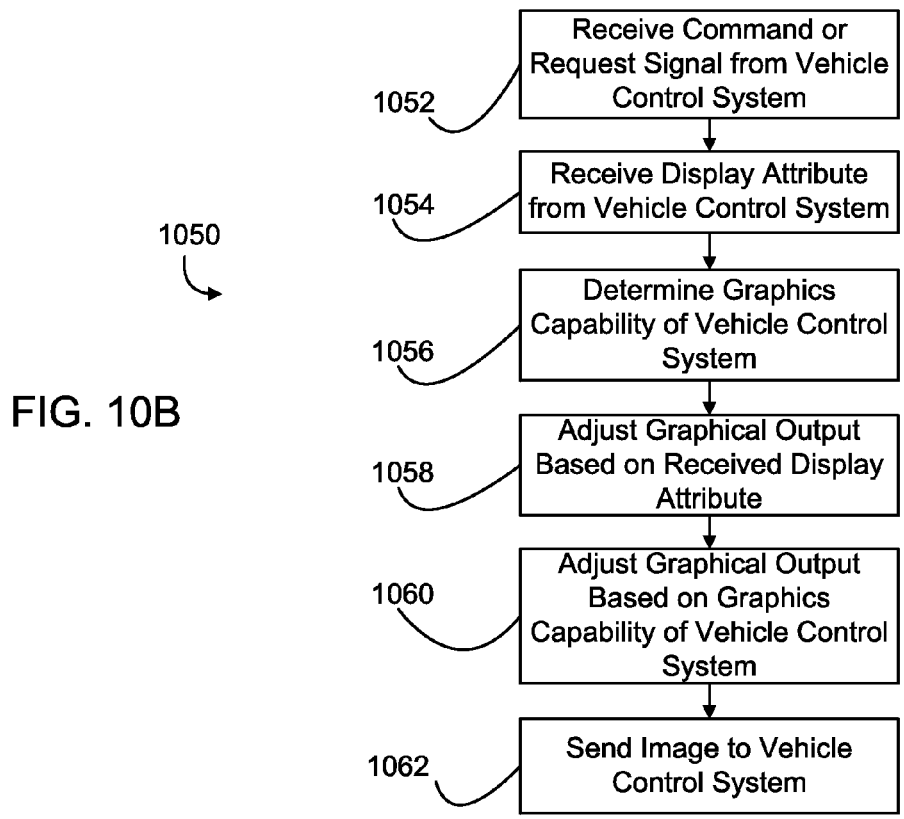
FIG. 10B is a flow chart of a process that a remote source may use to provide an image to a vehicle control system for display, according to an exemplary embodiment.

Referring now to FIG. 10B, a process 1050 is shown for sending images received from a remote source to a vehicle control system, according to an exemplary embodiment. The remote source may receive a command or request signal from a vehicle control system (step 1052). The remote source may also (or alternatively) receive a display attribute from a vehicle control system (step 1054). Using the received command, request, and/or attribute, the remote source may make a determination relating to the graphics capability of the vehicle control system (step 1056). This determination may relate to any the resolution of the vehicle control system, a screen size of the vehicle control system, a request image size, a use for the image, and/or a requested refresh rate of the vehicle display system. The remote source may, for example, use a display attribute relating to vehicle control system display size to crop, resize, rotate, sharpen, anti-alias, change contrast, or the like of any images for sending to the vehicle control system.

Referring further to FIG. 10B, process 1050 is shown to include the step of adjusting the graphical output based on the received display attribute (step 1058). Rather than only adjusting any images after they have been generated by the remote source, the remote source may also (or alternatively) be configured to adjust the actual graphical output of the remote source based on display attributes of the vehicle control system. Process 1050 may also (or alternatively) include the step of adjusting the graphical output based on a determined graphics capability of the vehicle control system (step 1060).

According to various exemplary embodiments, adjusting the graphical output may include actually adjusting the graphical output generated and provided to the display of the remote source. For example, a "reduced complexity" display or a "large text" display may be generated and output by the remote source on a display of the remote source. Once graphical output is adjusted, an image (e.g., of the graphical output of the remote source) may be sent to the vehicle control system (step 1062).

Figure 11A:
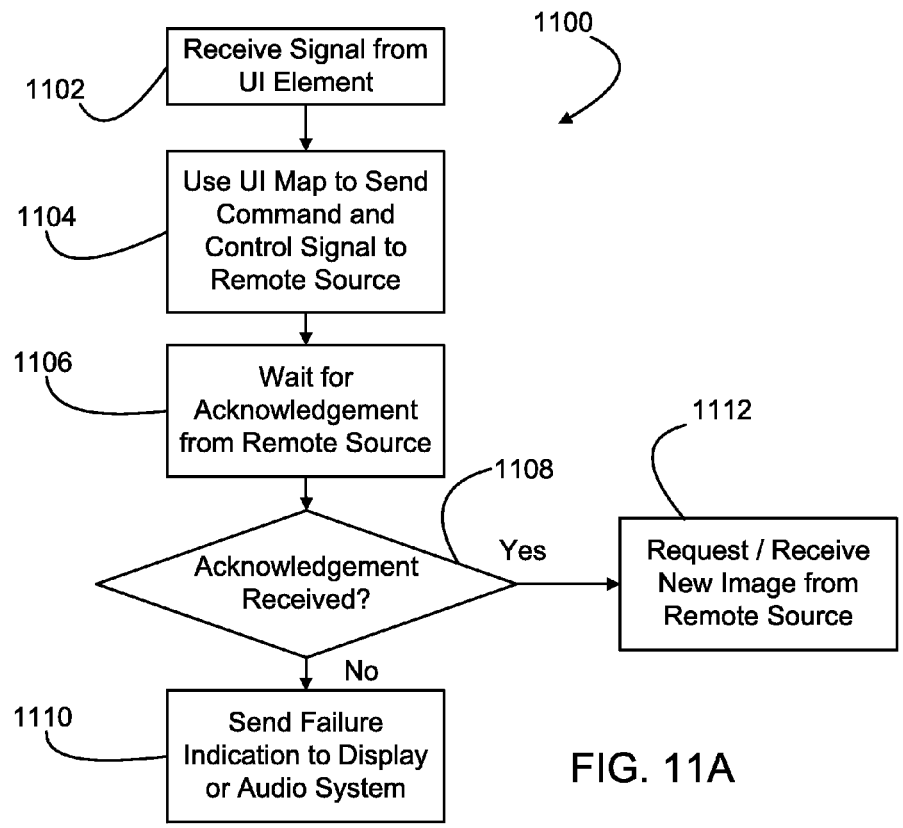
FIG. 11A is a flow chart of a process that the in-vehicle control system may use to interpret a signal received from a local user interface (UI) element and to provide a command and/or control signal to a remote source based on the signal, according to an exemplary embodiment.

Referring to FIG. 11A, a flow chart of a process 1100 that a vehicle control system may use to send commands or controls to a remote source is shown, according to an exemplary embodiment. Process 1100 is shown to include receiving a signal from a UI element (step 1102). The vehicle control system may be configured to take any number of steps to recognize or relate the signal to a programmed command or control activity. For example, the vehicle control system may use a UI map (e.g., a UI map generated in FIG. 6A or 6B) to access, recall, or lookup a command and/or control signal that relates to the received signal from a UI element. The command and/or control signal may then be provided to the remote source (step 1104). The vehicle control system may be configured to wait for an acknowledgement from the remote source (step 1106). If the acknowledgement is received (determination at step 1108), the vehicle control system may request and/or receive a new image from the remote source (or conduct any other next activity) (step 1112). If the acknowledgement is not received (or is negative), the vehicle control system may be configured to send a failure indication to the display or audio system (step 1110).

Figure 11B:
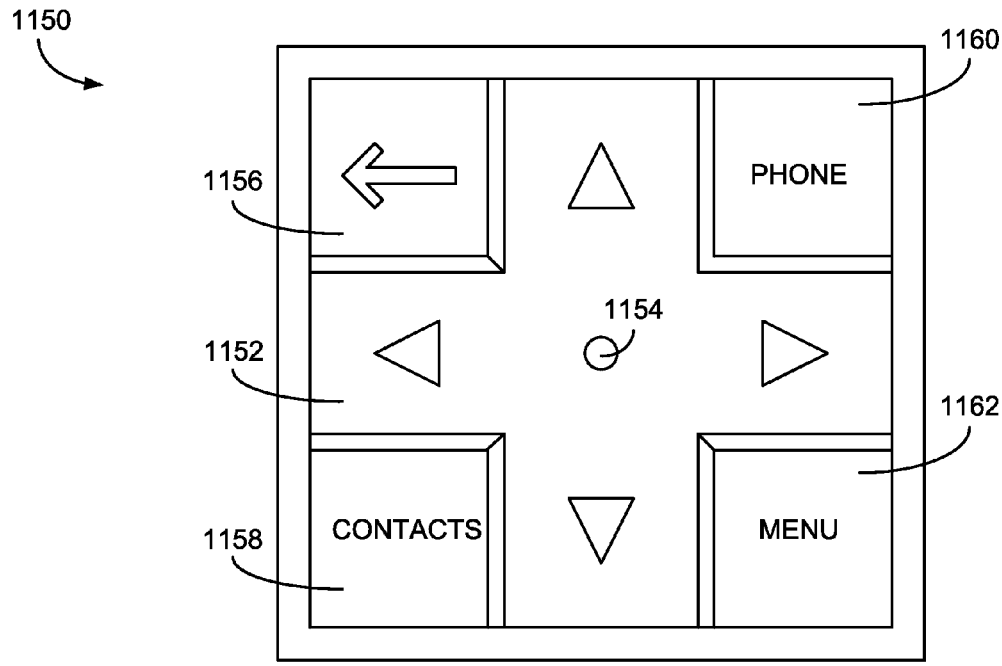
FIG. 11B is a front view of a programmable control, according to an exemplary embodiment.

Referring now to FIG. 11B, a front view of an exemplary programmable control 1150 that may include UI elements for mapping to UI features of a remote source is shown, according to an exemplary embodiment. Control 1150 may be for mounting to a vehicle interior element or for integrating with a vehicle interior element (e.g., a steering wheel). The control is shown to include a directional pad 1152, allowing the user to press an up, left, right, and down portion of the pad. The control may also be configured for pressing in on the center 1154 of the pad. At the corners of the directional pad might be provided one or more programmable buttons 1156-1162. Buttons 1156-1162 may have default settings. For example, button 1156 (which may include a graphic of a left arrow) in the upper left corner may correspond to a "back" command. Button 1160 in the upper right corner (which may include "phone" text) may be configured to correspond to a phone or hands-free feature or menu. Button 1162 (which may include "menu" text) may be configured to correspond to a home or root menu activity. Button 1158 (which may include "contacts" text) may be configured to trigger a contacts menu or the display of contacts. It should be noted that button element 1156-1162 may be programmed to features or macros of a connected portable device (e.g., via any of the mapping activities described in the present application). If a new portable device is brought into the vehicle and connected, the control system may be configured to automatically map one or more elements 1152-1162 of control 1150 to portable device commands, features, or macros. Profile information stored in a memory device of the control system may be accessed for each connected portable device, the profile information used by the vehicle control system to program one or more control elements. Accordingly, if a user brings a first portable device into the car and connects to the first portable device, the control system will configure map elements 1152-1162 to features of the first portable device. If a user brings a second portable device into the car and connects to the second portable device, the control system will configure map elements 1152-1162 to features of the second portable device. According to various exemplary embodiments, if a user connects more than one device to the vehicle control system and/or both devices have previously had features mapped to elements 1152-1162, the vehicle control system may prompt the user for which device's feature set to map to elements 1152-1162.

Figure 12:
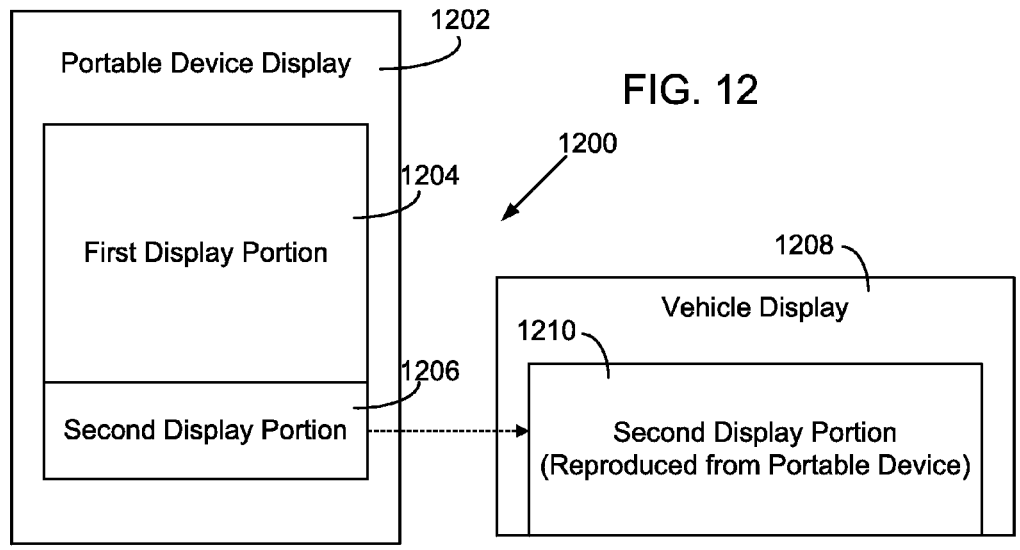
FIG. 12 is a block diagram of a vehicle display reproducing a partial image displayed on a portable device's display, according to an exemplary embodiment.

Referring now to FIG. 12, a block diagram of a display reproduction system 1200 is shown, according to an exemplary embodiment. A portable device display 1202 is shown having a first display portion 1204 and a second display portion 1206. The portable device may generally be configured to send an image of one or more portable display portions to the vehicle control system and/or display system 1208 for reproduction.

According to the embodiment shown in FIG. 12, a bottom or peripheral display portion 1210 is only sent to vehicle display 1208 for reproduction. Even when only a single display portion is reproduced on vehicle display 1208, an image representing the entire display 1202 shown on the portable device may be transmitted to a vehicle system. A check bit, command, or other code sent with the image to the vehicle system may indicate which portion of the image to reproduce. According to other exemplary embodiments, only the portion for reproduction on vehicle display 1208 may be sent from portable device display 1202 to vehicle display 1208. A vehicle system may send the portable device an indication of vehicle display size, resolution, a vehicle display size dedicated to display reproduction, or other information for describing attributes of vehicle display 1208.

According to an embodiment where a navigation interface of the portable device is reproduced on vehicle display 1208, the navigation software of the portable device may operate with (or may be) software specifically configured for display reproduction on vehicle display 1208. This software may have the "brand" or otherwise similar look and feel of the vehicle interfaces. The software may include a definition of the display portion that should be transmitted to the vehicle system. The software may be configured to only send the most important portion of the navigational image or GUI shown on portable device display 1202. Advantageously, this software can be resident and replaceable on the portable display device, thereby allowing accommodation to new software on the portable display device without requiring changes to the software associated with the vehicle. According to other exemplary embodiments, the vehicle or the portable device may be configured to make a determination that the images shown on portable device display 1202 would not fit or otherwise be totally represented on vehicle display 1208 and to request and/or send a partial image based on the determination.

Vehicle display 1208 may be a vehicle display mounted, integrated or otherwise provided to the vehicle interior. According to an exemplary embodiment, the display portion for reproduction is provided to a car head medium display or a head-up display. According to an exemplary embodiment, a vehicle control system includes user interfaces and logic for allowing the user to toggle and/or adjust display reproduction settings. The control system may be configured to allow a user to set conditions for display reproduction and/or frequency of reproduction. For example, in the situation in which the reproduced image is shown on a car medium display or head-up display, the user may choose to display the reproduced image or images prior to making change in direction, a merge, a turn, or otherwise. By way of further example, the vehicle control system may by reproduce images when the portable device issues acoustic directions. The reproduced image(s) may be displayed for some period of time (seconds, minutes, etc.) after the acoustic instructions have completed.

According to various exemplary embodiments, the vehicle control system and/or vehicle display system 1200 are configured to magnify, invert, sharpen, process, stretch, crop, overlay, process, or otherwise enhance any image portion received from the portable device. The enhancement activity may be user selectable and multiple enhancement activities may be provided at any one time or to any one image. For example, a control system might be configured to receive second display portion 1206 from a portable device, to invert the colors on the image for easier readability, to adjust the contrast of the image, to adjust the brightness of the image, to outline certain elements of the image, to magnify the image, to resize the image, and/or to soften the edges or provide anti-aliasing processing to the image.

Figure 13:
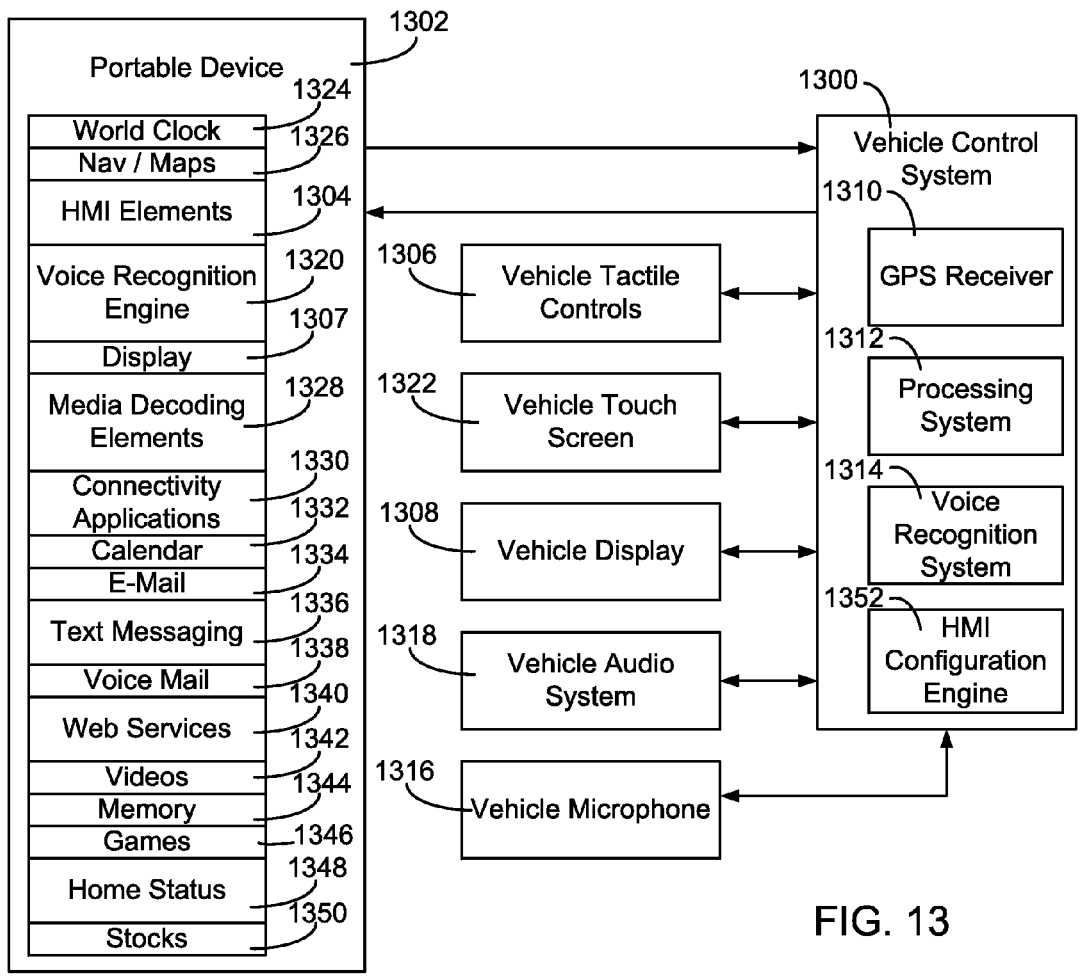
FIG. 13 is a block diagram of a vehicle control system configured to map features of a portable device to UI elements or features of the vehicle control system, according to an exemplary embodiment.

Referring now to FIG. 13, a block diagram of a vehicle control system 1300 for inheriting functions of a portable device 1302 and/or for providing functions to portable device 1302 is shown, according to an exemplary embodiment. The functionality of portable device 1302 and/or vehicle control system 1300 can be varied. Some functionalities of portable device 1302 may be complex to operate when driving. Other functionalities of portable device 1302 may generate and/or display quickly changing or detailed images that would not be appropriate to operate while the vehicle is in motion. Further, some features of portable device 1302 may not normally be available on vehicle control system 1300 and vise versa. Portable device 1302 and/or vehicle control system 1300 may be configured to utilize functionalities of the other device.

Human machine interface (HMI) elements 1304 of portable device 1302 may be used by vehicle control system 1300 via display reproduction, voice recognition, and/or by transferring data between portable device 1302 and control system 1300.

Tactile controls 1306 associated with vehicle control system 1300 may be used to control portable device activities and/or to make selections of display elements 1307 reproduced on a vehicle display 1308.

A GPS receiver 1310 of the vehicle may send location and/or heading information to portable device 1302 for use in one or more applications or for transmission to a remote source.

A processing system 1312 of vehicle control system 1300 might be used to process information, files, or streams provided to it by portable device 1302. Similarly, a processing system of portable device 1302 might be configured to process information, files, streams, or signals provided to it from vehicle control system 1300. When used in this manner, the processor more suitable and/or available for processing certain elements might be used.

A voice recognition system 1314 provided with vehicle control system 1300 may be used to provide control to portable device 1302.

A vehicle microphone 1316 may be used for more accurate detection of vocal utterances, the utterances sent from the control system to portable device 1302 for processing.

A vehicle audio system 1318 may be used to output audio signals provided to it by portable device 1302.

The voice recognition engine 1320 of portable device 1302 may be used by vehicle control system 1300 and/or by vehicle voice recognition system 1314 to provide additional features, extra processing capability, or otherwise.

A vehicle touch screen 1322 may be used to provide touch screen features to displays reproduced from portable device 1302 or to send other control signals to portable device 1302.

World clock information 1324 may be sent from portable device 1302 to vehicle control system 1300 for display, use in an emergency system, updating of vehicle clocks, or otherwise.

Navigational features, navigational databases, and/or map information 1326 may be provided from portable device 1302 to vehicle control system 1300 for display and/or processing.

Media decoding elements 1328 provided on portable device 1302 may be used to decode audio files stored on portable device 1302 and/or vehicle control system 1300. The decoded audio may be provided from portable device 1302 to control system 1300 for output via vehicle audio system 1318.

Connectivity applications 1330 of portable device 1302 may be utilized by vehicle control system 1300. For example, a TCP/IP stack, communications protocol element, security software, decryption algorithm, browser software, or communications or connectivity software may be utilized by vehicle control system 1300 to carry out vehicle control system communications tasks and/or to retrieve information for forwarding to vehicle control system 1300.

A calendar application 1332 of portable device 1302 may be utilized by vehicle control system 1300 to provide alerts, reminders, schedule information, a calendar display, a mechanism for accepting or rejecting meeting requests, or otherwise, to vehicle control system 1300, which may otherwise lack these features. According to various alternative embodiments, vehicle control system 1300 may include a calendar feature and may be configured to synchronize data with the calendar application and/or database of portable device 1302.

An E-Mail feature 1334 of portable device 1302 may be utilized by vehicle control system 1300 to receive E-Mail text, reproduce an inbox view, to play back voice mails residing in an E-Mail inbox, and/or to draft and send an E-Mail (e.g., using the voice recognition feature of the vehicle).

A text messaging feature 1336 of portable device 1302 may be utilized by vehicle control system 1300 to receive text messages, to send text messages, to reproduce an inbox view, and/or to draft and send a text message (e.g., using the voice recognition feature of the vehicle).

A voice mail feature 1338 of portable device 1302 may be utilized by vehicle control system 1300 to display or audibly provide an indication that a new message has arrived, the number of new messages, the number of undeleted messages, the number of saved messages, and/or the contents of the voice mail (via audio and/or text via a speech to text module provided in the vehicle, etc.).

Web services 1340 of portable device 1302 may be utilized by vehicle control system 1300 to provide web-based transmissions and/or receptions of information, to parse information, display information, or otherwise.

Video services 1342 of portable device 1302 may be utilized by vehicle control system 1300 to provide video decoding and/or playback features to the vehicle. For example, vehicle control system 1300 may include provisions for playing a standard MPEG file. Portable device 1302 may include a unique codec and/or application for decoding a media file stored on portable device 1302 or vehicle control system 1300.

A flash memory element 1344 (or other memory element) of portable device 1302 may be utilized by vehicle control system 1300 to store media files, configuration files, and/or any other type of information.

Games 1346 provided on the portable element may be provided to vehicle control system 1300 and/or to vehicle display 1308 or vehicle audio system 1318 thereof. Vehicle control system 1300 may be configured to forward game information to a rear seat entertainment system, wireless headphones via a vehicle-mounted transmitter, or otherwise.

Home status information 1348 available at portable device 1302 may be forwarded to vehicle control system 1300 for processing, display, and/or user alerts. For example, portable device 1302 may be configured to receive an alert from a home security system. The alert may be forwarded from portable device 1302 to vehicle control system 1300 for display, processing, and/or audible indication.

Stock market information 1350 or applications available on portable device 1302 may be forwarded (or otherwise retrieved) from portable device 1302 to vehicle control system 1300.

In situations where the normal display and/or menu mode of portable device 1300 is not desirable for display reproduction or otherwise, portable device 1302 may be configured to switch from a normal mode of operation to a vehicle mode of operation. A vehicle mode of operation may include a mode whereby the remote source generates, displays, and/or provides images more suitable for reproduction and/or enlargement on a vehicle display than the images normally shown on the remote source. Human machine interface (HMI) configuration engine 1352 may generally be a hardware and/or software module for allowing a user of vehicle control system 1300 to configure vehicle control system UI elements (e.g., elements 1306, 1322, 1316, etc.) for operation with features of the portable device. For example, HMI configuration engine 1352 may be used to program control 1150 shown in FIG. 11B for operation with portable device 1302 and/or one or more features thereof. User input received by HMI configuration engine 1352 may be stored in a memory unit, database, profile, or configuration file of vehicle control system 1300 for later retrieval and/or use.

Figure 14:
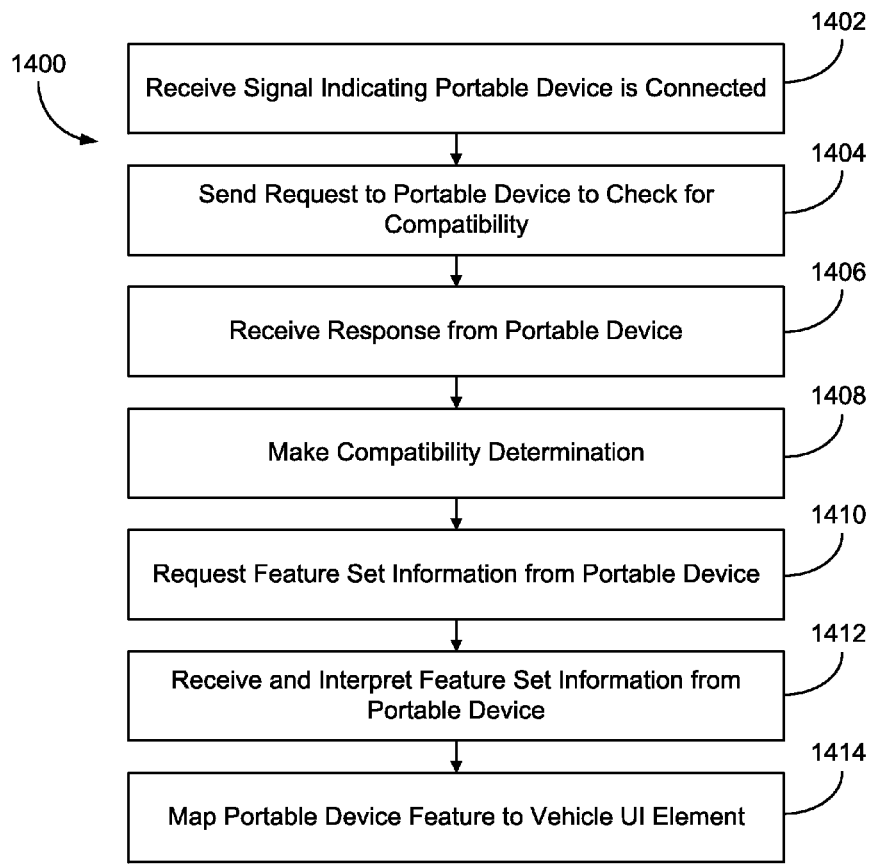
FIG. 14 is a flow chart of a process that the vehicle control system may use to map a portable device's feature to a UI element or feature, according to an exemplary embodiment.

Referring now to FIG. 14, a flow chart of a process 1400 for inheriting a feature of a portable device is shown, according to an exemplary embodiment. The process may include receiving a signal indicating the portable device is connected (wirelessly or wired) or otherwise ready for functional communication (step 1402). A vehicle control system may send a request to the connected portable device to check for compatibility with a feature inheriting activity (step 1404). After the vehicle control system receives a response from the portable device (step 1406), the control system may be configured to make a compatibility determination (step 1408). The compatibility determination may effect which features the vehicle attempts to inherit from the portable device. The vehicle control system may then request feature set information from the portable device (step 1410). The feature set information may include one or more feature tables, text files listing available features, device type or class identifiers, or otherwise. The vehicle control system may be configured to receive and interpret the feature set information (step 1412) and to map a portable device feature to a vehicle user interface element (step 1414). For example, if the portable device includes a one-touch dialing feature, a return call button, a list N calls list, or another desirable feature, the vehicle control system may map a routine or command for sending to the portable device to receiving a signal from a programmable button on the steering wheel.

Figure 15:
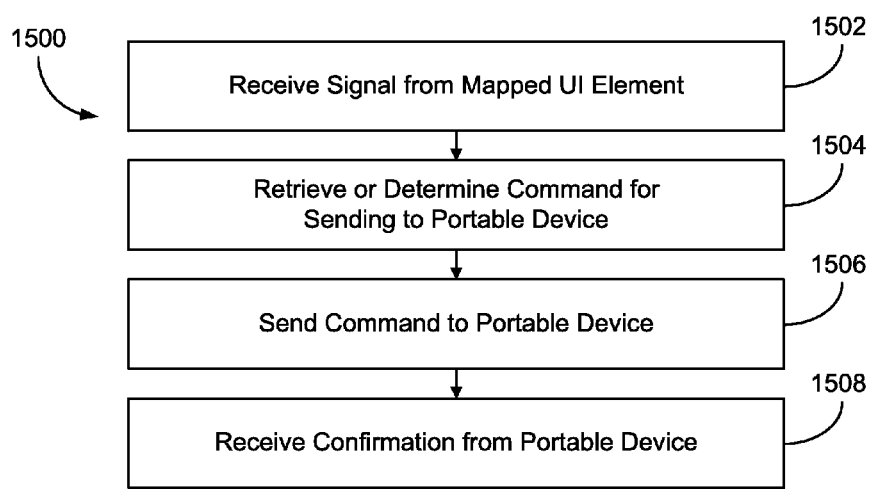
FIG. 15 is flow chart of a process that the vehicle control system may use to send a command to a portable device based on a mapped UI element, according to an exemplary embodiment.

Referring now to FIG. 15, a flow chart of the activity 1500 of a vehicle control system based on the programmed/mapped user interface element is shown, according to an exemplary embodiment. The process includes receiving a signal from a mapped user interface element (e.g., receiving a signal that a programmable button on the steering wheel has been pressed) (step 1502). In response to this signal, the vehicle control system may retrieve or otherwise determine the appropriate command or control signal for sending to the portable device, the command or control signal configured to trigger or request the execution of the desired portable device feature (step 1504). The command or control signal is sent to the portable device (step 1506). The portable device may send a confirmation signal to the vehicle control system in response to the command (step 1508).

Figure 16:
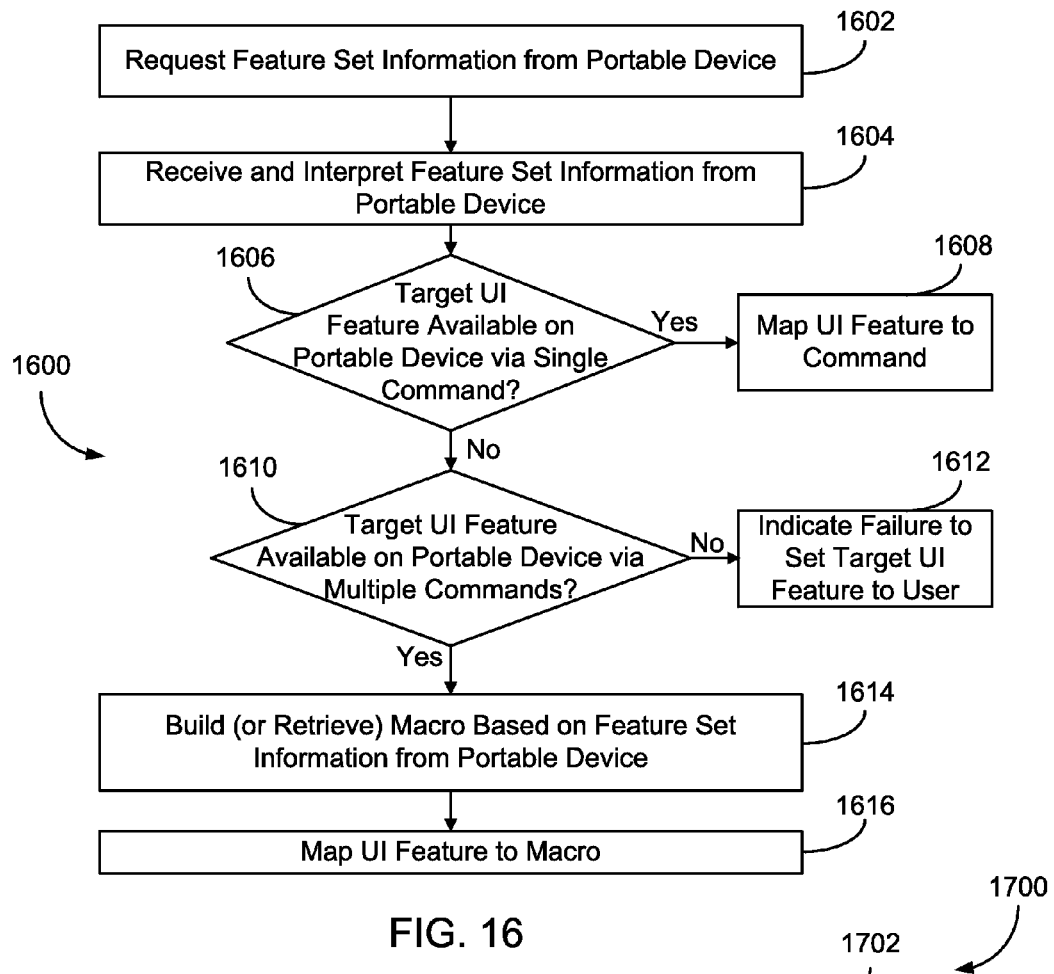
FIG. 16 is a flow chart of a process that the in-vehicle control system may use to map multiple remote source commands to a vehicle UI element, according to an exemplary embodiment.

Referring now to FIG. 16, a flow chart of a process 1600 of a vehicle activity to inherit a multiple-command feature from a portable device is shown, according to an exemplary embodiment. The vehicle control system may be configured to inherit a multiple-command feature from a portable device. A multiple-command feature may be a target user interface feature that is desired by the user. For example, a vehicle occupant may desire to display a recently called list on the vehicle display, but the display of the recently called list may require two commands at the portable device (e.g., a phone menu must be accessed followed by the selection of an item on the phone menu). The vehicle control system may request feature set information from the portable device (step 1602) and receive and interpret the feature set (step 1604). Feature information stored in the portable device may indicate that the target user interface feature is available via multiple activities or a single command (steps 1606, 1610). The vehicle control system may parse or otherwise interpret the feature information. If the target user interface feature is available on the device via a single command, the user interface feature may be mapped to the command (step 1608). If the target user interface feature is only available on the device via multiple commands, the in-vehicle control system may be configured to build (or retrieve from memory) a macro (e.g., script, table to be parsed, text file to be parsed, etc.) based on any number of processes and/or the feature set information from the portable device (step 1614). A vehicle user interface feature may then be mapped to the macro (step 1616). Otherwise, a failure to set a target user interface feature to the user may be indicated (step 1612).

Figure 17:
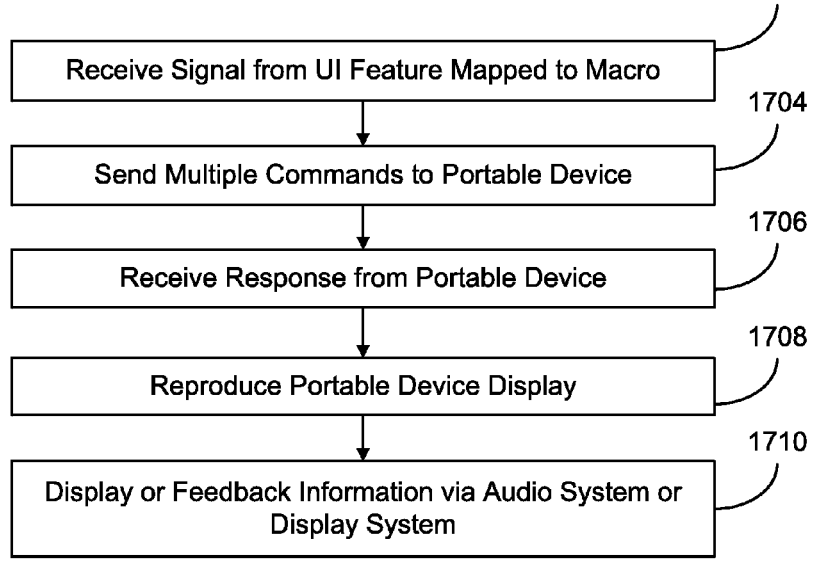
FIG. 17 is a flow chart of a process that the in-vehicle control system may use to may use to send a commands to a portable device based on a UI element mapped in a process such as the process shown in FIG. 16, according to an exemplary embodiment.

Referring now to FIG. 17, a process 1700 of the vehicle for using the multiple-command feature is shown, according to an exemplary embodiment. Process 1700 includes receiving a signal from a UI feature mapped to a macro, parsing or executing the macro (step 1702), and sending multiple commands to a portable device based on the macro (step 1704). The vehicle control system may wait some period of time for a response from the portable device (e.g., prior to trying again or timing out) (step 1706). According to an exemplary embodiment, the vehicle control system will wait a period of time that it expects the portable device to respond with and then begin reproducing the portable device's display (step 1708). This activity may help to provide a seamless transition from vehicle button press to the display of information relating to the button press. If information is sent to the vehicle control system based on the macro, the vehicle control system may send an audio signal to the vehicle audio system and/or a display signal to the vehicle display system (step 1710).

Figure 18:
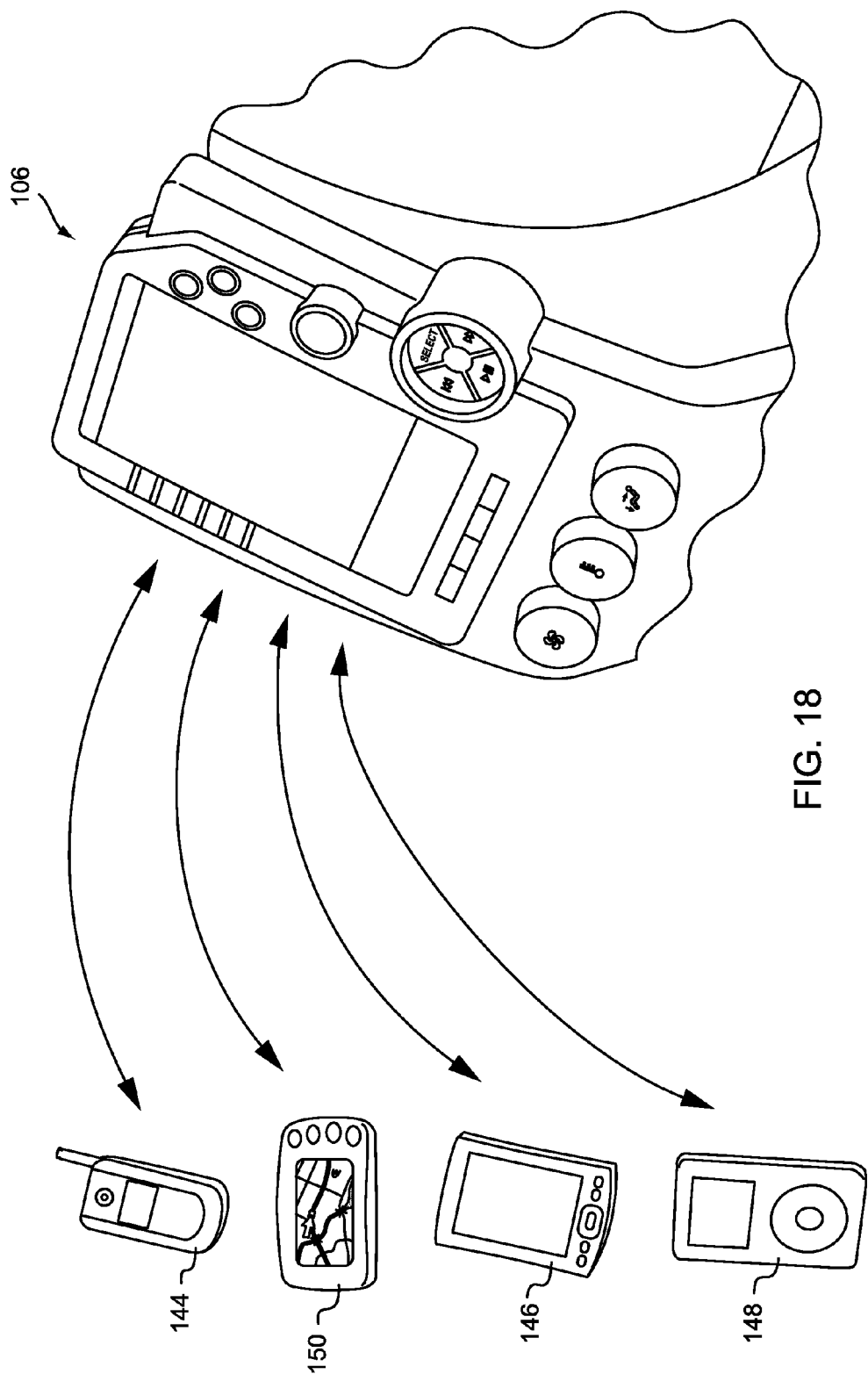
FIG. 18 is a schematic of multiple devices that may connect to a vehicle control system, according to an exemplary embodiment.

Referring to FIG. 18, according to an exemplary embodiment, control system 106 is shown having data connections with a variety of remote sources. For example, control system 106 may establish a data connection with cellular telephone 144, PDA 146, media player 148, PND 150, etc. Control system 106 may be configured to establish simultaneous data connections with a plurality of remote sources using communications device 120 of FIG. 3. For example, control system 106 may establish a simultaneous data connection with cellular telephone 144 and media player 148. According to various exemplary embodiments, control system 106 may establish simultaneous data connections with any combination and/or number of remote sources. Control system 106 may use a data processing system and/or a communications device to control the communications between the vehicle control system 106 and a plurality of remote sources. The connected remote sources may transmit data directly to or from vehicle control system 106. Vehicle control system 106 may also be used as a network gateway or router and may be configured to route information from one remote source to other remote sources connected to the vehicle control system 106.

Figure 19:
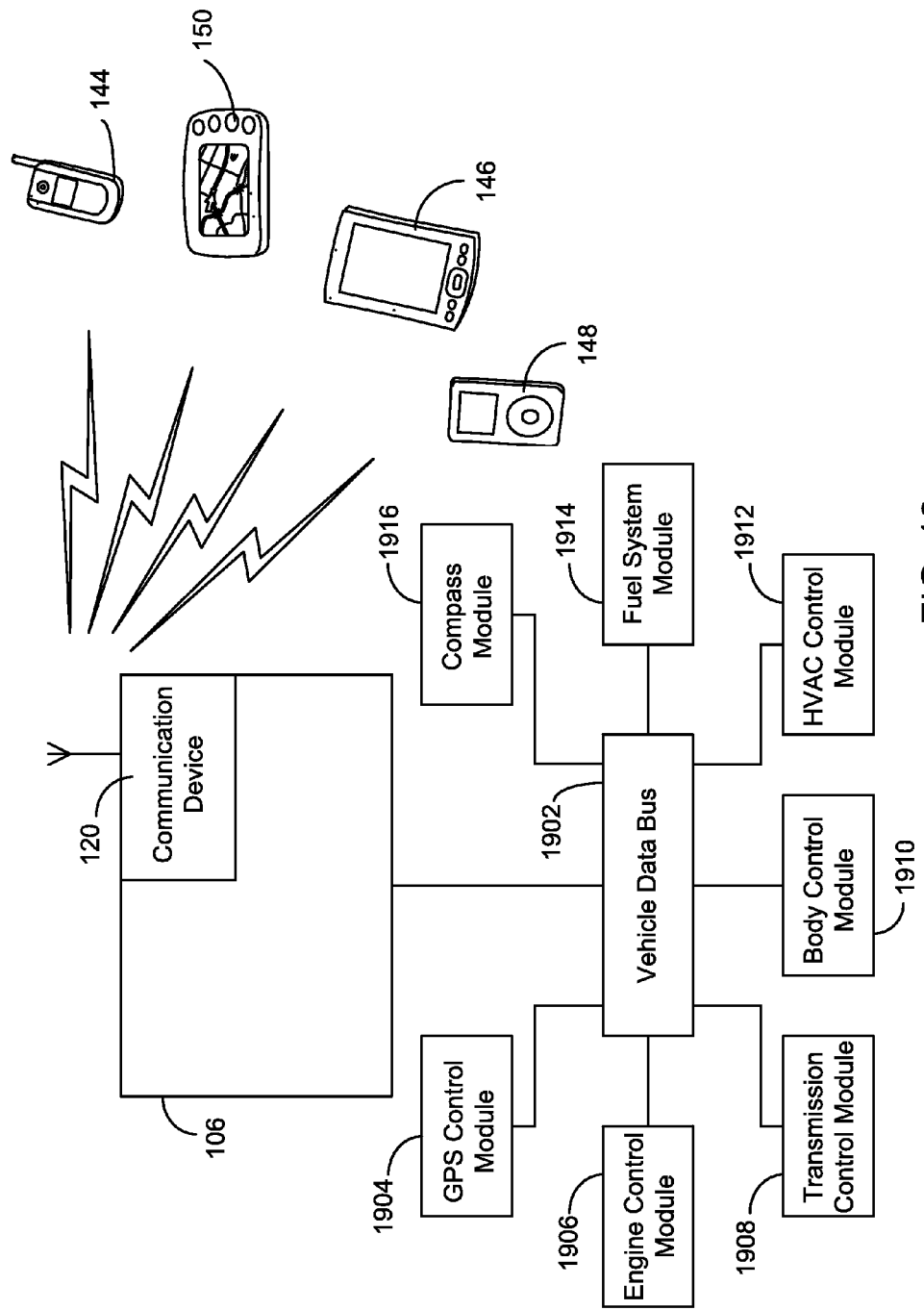
FIG. 19 is a block diagram of a vehicle control system connected to vehicle modules and subsystems via a vehicle data bus, according to an exemplary embodiment.

Referring to FIG. 19, according to an exemplary embodiment, control system 106 is shown having a connection with a vehicle data bus 1902. The connection with vehicle data bus 1902 may be via an interface module of the control system. Vehicle data bus 1902 may be connected to a number of vehicle modules. These modules may include a GPS receiver module 1904, an engine control module 1906, a transmission control module 1908, a body control module 1910, a HVAC control module 1912, a fuel system module 1914, a compass module 1916, a timing control module, an anti-lock braking module, etc. Vehicle data bus 1902 may be any electronic communications network that interconnects vehicle components. The vehicle modules connected to the vehicle data bus may typically receive input from sensors (e.g., speed sensors, temperature sensors, pressure sensors, etc.) that the vehicle module may use in calculation. Vehicle modules may also use actuators to conduct actions commanded by the modules (e.g., turn on a cooling fan, change a gear, unlock a door, etc.). The modules may be configured to exchange data between themselves via the vehicle data bus 1902. Control system 106 or processing system 122 (shown in FIG. 3) may be configured to route information to or from vehicle modules on the vehicle data bus to or from other components of the control system or to or from remote sources. According to various embodiments, vehicle bus 1902 may be a vehicle bus of any type or technology. For example, vehicle bus 1902 may be a local interconnect network, a controller area network, a FlexRay bus, a Media Oriented System Transport, a Keyword Protocol 2000 bus, a serial bus, a parallel bus, a Vehicle Area Network, a DC-BUS, a IDB-1394 bus, a SMARTwireX bus, etc. According to various exemplary embodiments, vehicle data bus 1902 may be of any past, present or future design capable of providing an electronic communications network that interconnects vehicle hardware components inside a vehicle.

Referring further to FIG. 19, according to an exemplary embodiment, control system 106 may access data of vehicle data bus 1902, and further of vehicle hardware modules 1904-1916, to provide features to control system 106 and/or to remote sources 144-150. For example, control system 106 may read compass information from compass module 1916 via vehicle data bus 1902. Control system 106 may display this information on any of its embedded displayed, but may also transfer this information to a remote source for further transmission, display, or processing. For example, remote source 150 (a PND) may use the information retrieved from the compass module to more accurately generate navigational images for transmission to the in-vehicle output display. According to another exemplary embodiment, fuel system module 1914 may send a low fuel warning or information to control system 106. Control system 106 may then use a WiFi-enabled PDA 146 or a cellular phone 144 to download information regarding nearby gas stations. This information may be forwarded to control system 106 for processing and display or routed through control system 106 to PND 150 for processing on the PND. It is important to note than any number of enhanced data or control features may be added to control system 106 and/or to connected remote sources 144-150 when control system 106 is capable of serving as a network gateway simultaneously connected to a plurality of remote sources and vehicle hardware modules of a vehicle data bus.

Figure 20:
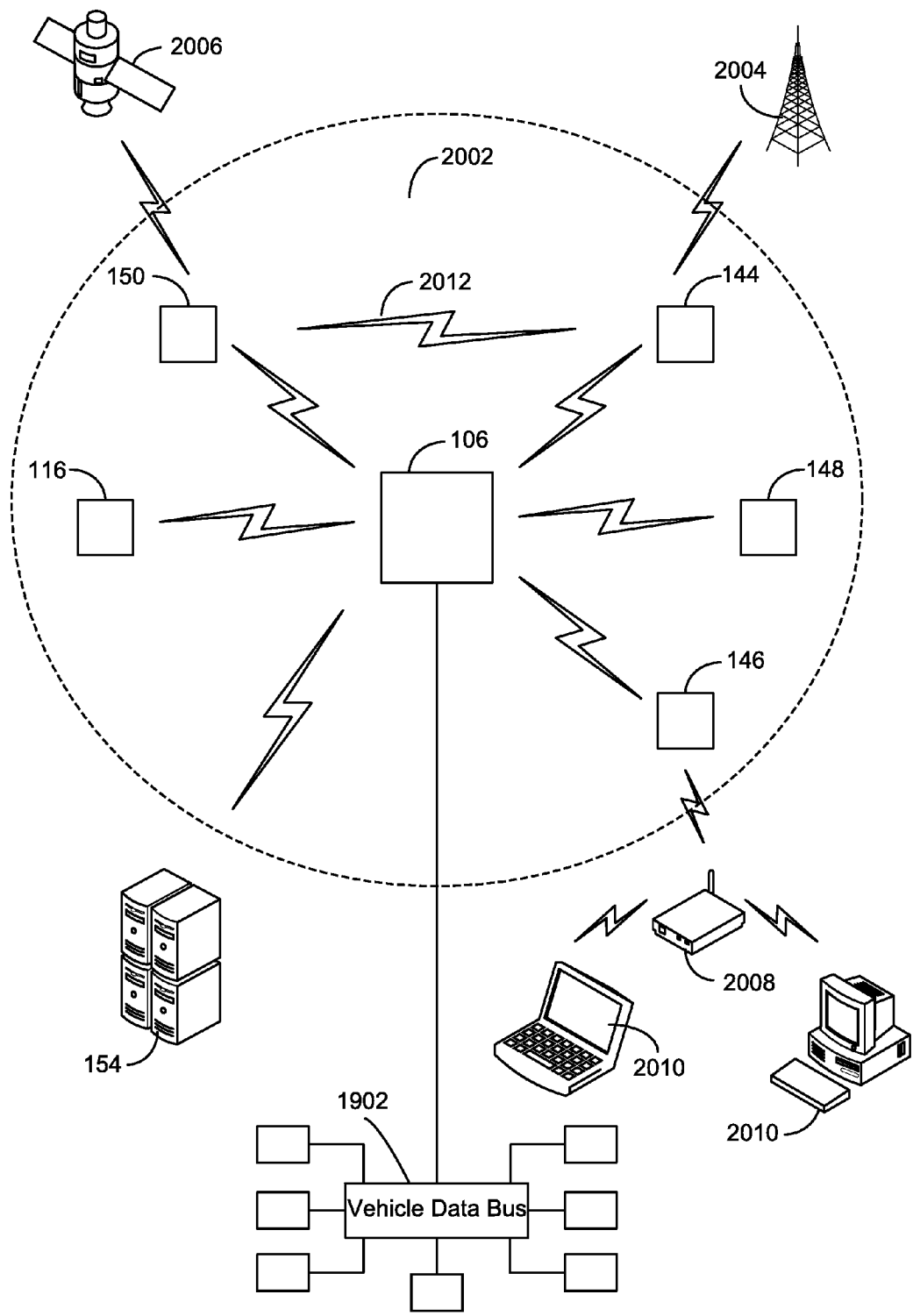
FIG. 20 is a block diagram of a vehicle control system connected to a plurality of remote sources, according to an exemplary embodiment.

Referring to FIG. 20, according to an exemplary embodiment, a control system 106 having a communications device 120 (shown in FIG. 3) capable of serving as a communication gateway is illustrated. Control system 106 may be simultaneously connected with devices on the vehicle data bus, a plurality of remote sources 116, a remote server 154, and/or any number of other in-vehicle systems or remote sources. The communications device may be a communications device capable of serving as a wireless network gateway. The communications device may be a communications device capable of creating a piconet. Multiple devices and/or remote sources may be capable of forming communications links with the communications device. The communications device may serve as a master node in a one-to-many data network, with any number of remote sources acting as slaves. According to one exemplary embodiments, the communications device is a Bluetooth communications device capable of serving as a master device or a slave device on a Bluetooth piconet or scatternet. Processing system 122 (of FIG. 3) and the communications device may be configured to establish communications links, control data activities, and conduct user interface functions necessary to provide network gateway features to in-vehicle control system 106. According to various other exemplary embodiments, the communications device may be a communications device (or group of communications devices) of any type or design of the past, present or future capable of establishing multiple wireless data connections and serving as a network gateway. The communications device may work in conjunction with data processing systems of the control system to accomplish various communications and data tasks.

Referring further to FIG. 20, according to an exemplary embodiment, control system 106 has a first wireless data communications range 2002. This first wireless data communications range may be based on a first wireless protocol or technology. Control system 106 may have a second wireless data communications range that enables it to connect with remote sources outside of its first wireless data communications range. For example, control system 106 may include a second wireless protocol or technology that allows it to communicate with a remote server 154 located beyond the first wireless data communications range 2002. While control system 106 is shown communicating with remote sources 116 in a star or one-to-many network topology, any network topology may be used. For example, control system 106 and its communications device may serve as a node of a meshed network. It is important to note that each remote source 116 may also have multiple communications methods, devices, and/or protocols. For example, remote source 144 may be a mobile phone capable of maintaining simultaneous data connections with control system 106 and a cellular antenna 2004. Similarly, PND 150 may be a GPS device capable of maintaining simultaneous data connections with control system 106 and a satellite 2006. Remote source 146, a PDA, for example, may be capable of maintaining simultaneous data connections with control system 106 and a WiFi router 2008. When used in this manner, PDA 146 may access or communicate with devices on an external network (e.g., computers 2010 of the WiFi network formed by wireless router 2008, etc.). Remote sources 116 may also be configured to communicate between themselves. For example, remote sources 150 and 144 may be capable of communicating between themselves while maintaining a connection with control system 106. This connection is shown as communications link 2012.

Referring further to FIG. 20, control system 106 may serve as a wireless (or wired) access point or router for all remote sources connected to the control system. For example, remote source 144 (e.g., a PDA) may be able to send information to computers 2010 from remote source 150 (e.g., a portable media player) using control system 106 to route data from remote source 150 to 144 to computers 2010. Control system 106 may be able to route information from the vehicle modules connected to the vehicle data bus to remote sources and/or eventually to the network of router 2008 and computers 2010. According to various exemplary embodiments, control system 106 may route information to and from any vehicle module, system device, or remote device to which it is connected. Control system 106, including its data processing system and communications device, may be configured to conduct all network tasks necessary to facilitate the described data communications tasks. For example, control system 106 may control the communications device to pair remote sources 116 to in-vehicle control system 106. Control system 106 may provide a user interface prompting the user through a pairing process. Once devices are paired and connected, the communications device may conduct any number of digital and/or analog communications tasks necessary to conduct desired data or voice communications. For example, the communications device (with or without help from a data processing system) may conduct any number of encryption tasks, modulation tasks, spread spectrum tasks, prioritizing tasks, frequency hopping tasks, etc.

Figure 21:
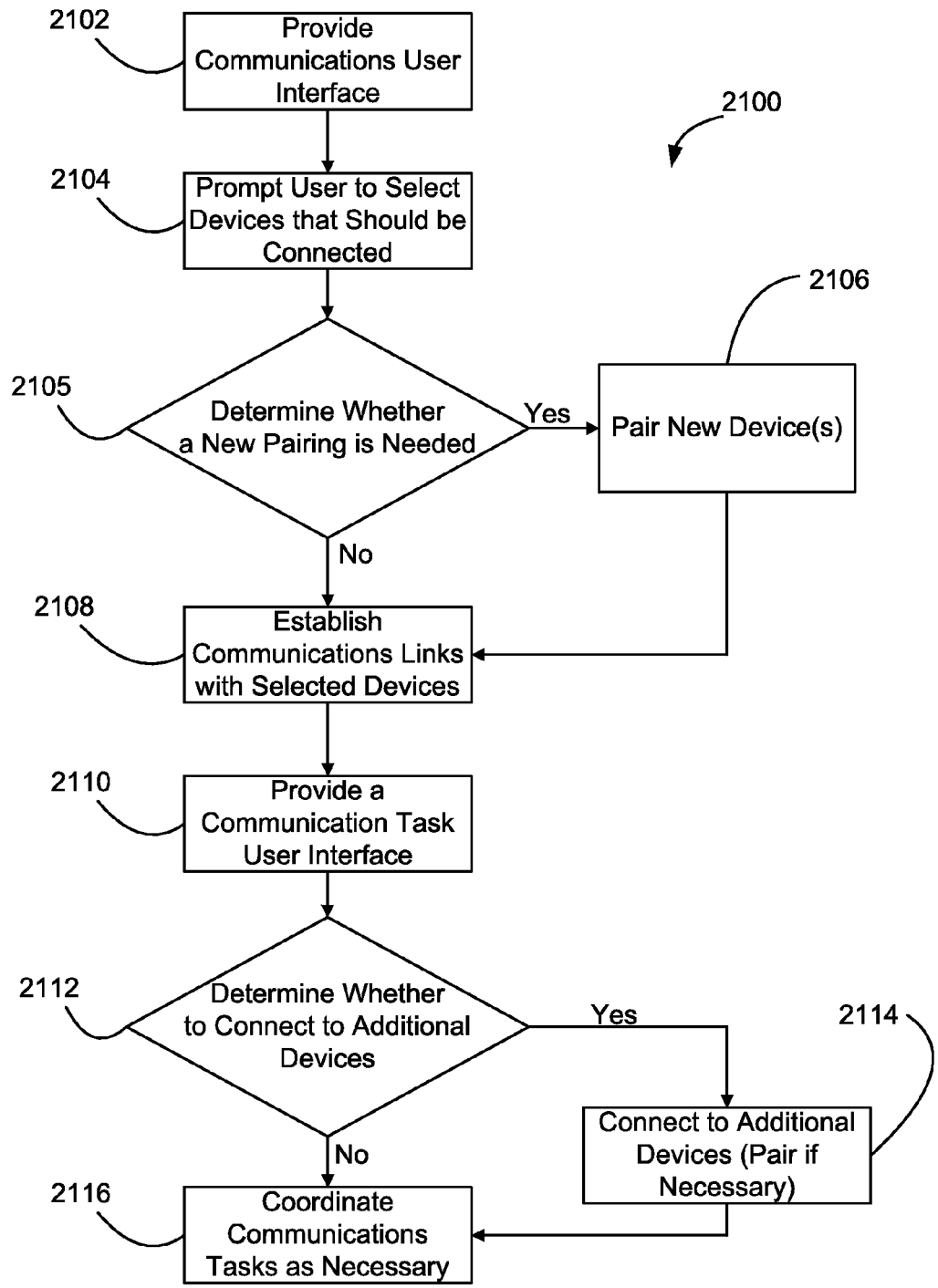
FIG. 21 is a flow chart of a process for facilitating the connection of multiple devices, according to an exemplary embodiment.

Referring to FIG. 21, according to an exemplary embodiment, a process 2100 that may be used to connect with a plurality of remote devices via an in-vehicle control system is illustrated. The in-vehicle control system may provide a communications user interface on the output display (step 2102) when a user has indicated that he or she would like to establish a communications link or conduct a communications task. The control system may then prompt the user to select devices that should be connected (step 2104). Once a user has selected the devices that he or she would like to connect to, the control system may then determine whether a new pairing is necessary (step 2105). If a new pairing is needed, then the system will conduct a pairing routine (or device setup routine) (step 2106). If a new pairing is not needed, or after all necessary devices have been paired, the control system may then coordinate establishing communications links with the selected devices (step 2108). The control system may then provide a communication task user interface via the output display (step 2110). The communication task user interface may provide a menu of possible communication tasks that may be accomplished with the control system than the connected remote sources. For example, the user may select a communication task such as: "Send My Position to a Contact" using the control system's output display and input devices (e.g., buttons, voice recognition, etc.). The control system may then determine whether to connect or establish communications links with additional devices (step 2112). If additional communication links need to be established, the control system will coordinate the connections to additional devices, including pairing the devices, if necessary (step 2114). Once a user has selected a communications task and the control system has established all necessary communications links, the control system may then coordinate the selected communications tasks as necessary (step 2116). For example, if the user has selected the "Send My Position to a Contact" communication task, the control system may determine that a data-capable cellular telephone connection and a GPS device should be involved and connected. The control system may establish communication links with these devices and facilitate the necessary communications. For example, the control system may request coordinates from the GPS device, store the coordinates in a memory device of the control system temporarily, transfer the coordinates to the cellular telephone, and command the cellular telephone to send the coordinates in a text message to a selected contact.

Figure 22:
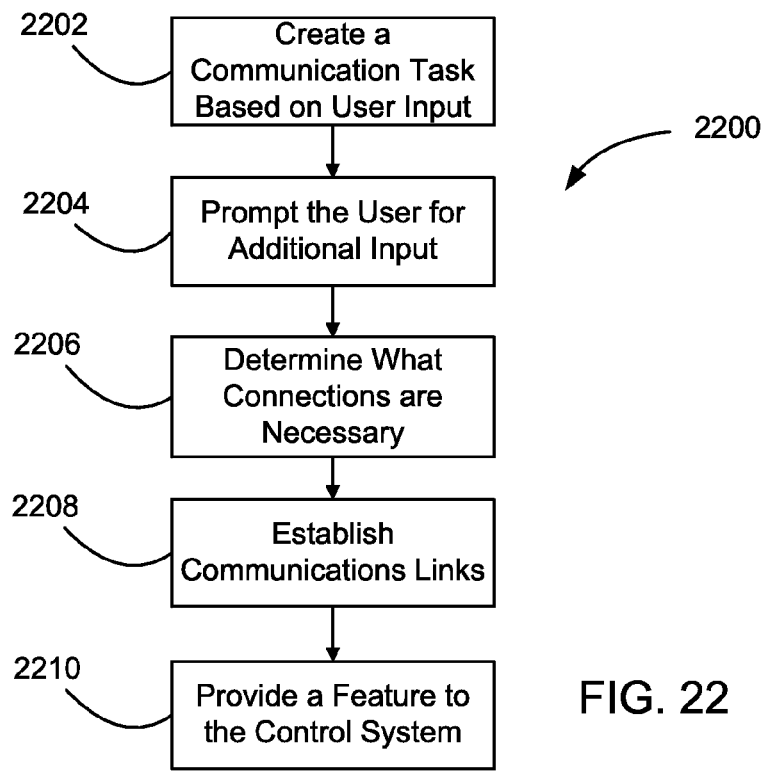
FIG. 22 is a flow chart of a process for completing a communication task, according to an exemplary embodiment.

Referring to FIG. 22, according to an exemplary embodiment, a process 2200 that may be used to provide a feature to the control system is illustrated. After any number of device setup and/or pairing steps have been accomplished, the control system may take user input regarding an activity the user would like to complete. The control system may create a communication task based on the user input (step 2202). A communication task may be a task that may be executed by the control system and remote devices to provide a result or an output. The system may prompt the user for additional input (step 2204) to create the communication task. The control system may determine what device connections are necessary (step 2206), before establishing communications links (step 2208) with all necessary devices. When used in this manner, the user may not need to first enter which devices should be connected, but the control system will determine these connections without unnecessary user input. Once the necessary communications links have been established, the control system may use the connected remote devices to provide a feature to the control system (step 2210). A feature provided to the control system may be a data feature or a user interface feature. For example, a data feature may be to provide data to the control system that would not otherwise be available, were it not for the connected remote sources. A user interface feature may be to provide a user input method or output method that the control system would not otherwise be able to accomplish, were it not for the connected remote sources. According to various exemplary embodiments, the control system may use any number of remote sources to receive a new data or interface feature. An example of a data feature might be as follows: a WiFi-capable PDA may be able to retrieve a new media file from a WiFi-capable server, the control system may read the artist information from the media file and use a simultaneous data connection with a data-capable cellular telephone to download ticket information for that artist. Either the reception of the media file or the reception of the ticket information might be a data feature that the control system would not otherwise have been able to accomplish. An example of an interface feature might be as follows: a PND may be able to receive GPS information and generate images for display on the PND's own local or embedded display. The connection between the control system and the PND may be used to provide image transfer (or video transfer) from the PND to the output display of the control system. The user may operate the user interface features of the PND to change the display of the control system. When used in this manner, the additional display feature and/or the use of the PND's inputs might be an interface feature that the control system would not otherwise have been able to accomplish.

Figure 23:
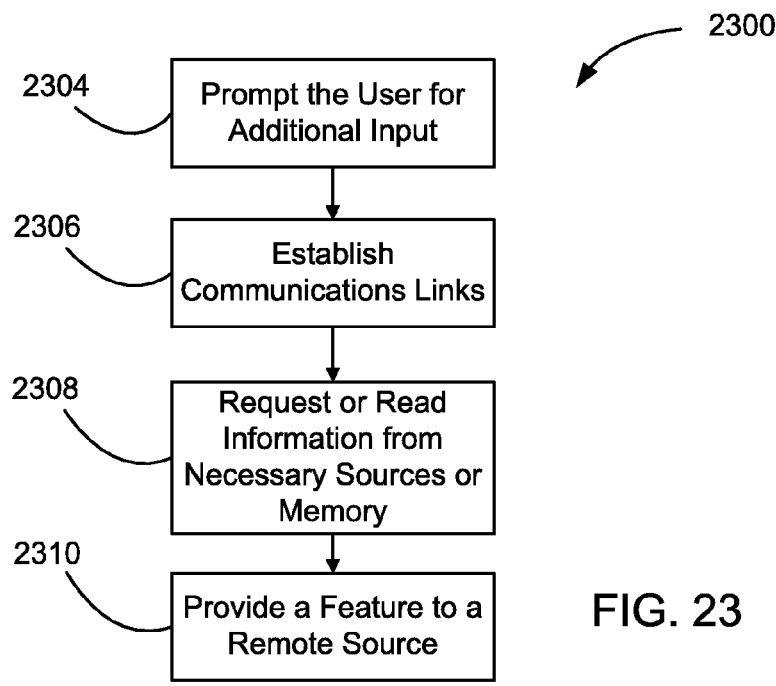
FIG. 23 is a flow chart of a process for providing a feature to a remote source, according to an exemplary embodiment.

Referring to FIG. 23, according to an exemplary embodiment, a process 2300 of providing a feature to remote sources is illustrated. After any number of selection, pairing, or determination steps as described in previous paragraphs or otherwise, the control system may prompt the user for additional input to begin providing a feature to a remote source (step 2304). The control system may then establish communications links between the control system and any necessary components, modules, or remote sources (step 2306). After a communications link has been established any connected device (e.g., the control system, the remote source, vehicle modules, etc.) may request, read, and/or receive information from other sources or memory as necessary (step 2308). Using the communications link and any other relevant data, the control system (or other sources connected to the control system) may provide a feature to the remote source. The feature may be a feature the remote source would not otherwise have been able to accomplish. The feature may be a data feature or a user interface feature. Data features provided to remote sources may include a particular remote source accessing data residing or generated on other remote sources or data on the vehicle data bus. For example, a remote source may be able to access features such as compass data, stabilization control data, speed data, low fuel data, service data, etc. A remote source may also be provided user interface features by the control system or other remote sources. For example, using a data connection between the control system and a remote source, the control system's voice recognition processing could be used to command and control the remote source. Interior switches, buttons, or touch screen features of control system 106 may be used to provide an enhanced user interface feature to connected remote sources 116.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

According to any preferred embodiment, control system 106 is an in-vehicle control system 106 as generally illustrated by the FIGS. Control system 106 may include memory device 132 having a non-volatile memory 142 and a volatile memory 140. Control system 106 may also include at least one communications device 120 configured to communicate with a variety of different devices or remote sources. Communications device 120 may be a wireless communications device configured to communicate with a variety of wireless remote sources (e.g., mobile phone 144, PDA 146, media player 148, PND 150, pager 152, remote source 116, remote server 154, etc.). Communications device 120 may be coupled to a data processing system 122, a memory device 132, and an output display 108. This system may be configured to receive images over the communications link established between the communications device 120 and the remote source 116. The received images may be at least partially generated by the remote source 116. Once received, the data processing system 122 may be configured to coordinate the communications device 120 and the output display 108 for the purpose of displaying the received images on the output display 108. The received images may be received and displayed such that the output on the in-vehicle control system's output display 108 is an enlarged duplication or replication of the display 501 of the remote source 116. The received images may be entirely generated by the remote source 116. The data processing system 122 may be configured to conduct image processing tasks on the received image while the image resides in memory device 132 or otherwise. Image processing tasks may include scaling the image to different sizes or changing the resolution. The in-vehicle control system may also be able to receive meta information, navigational aide data, user interface information, or phone information. This additional information may be processed and used to for various input and/or output tasks that may supplement the display reproduction activity or otherwise enhance vehicle or remote source user interface features.

The user may make adjustments to the display reproduction, including changing the transmission or bitmap display refresh rate. Adjustments may be communicated to the remote source or accomplished via local processing. Adjustment settings may be stored in a display profile within the non-volatile memory of the in-vehicle control system 106. According to various other exemplary embodiments, an in-vehicle control system is provided having components of any past, present or future design or type capable of reproducing images displayed on a remote source, using image information received over a communications link.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

It is important to note that the construction and arrangement of the control system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., control system 106, memory device 132, communications device 120, data processing device 122, remote source 116, remote server 154, etc.), the position of elements may be reversed or otherwise varied (e.g., the components of control system 106, etc.), and the nature or number of discrete elements or positions may be altered or varied (e.g., communications device 120, memory device 132, the components of control system 106, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for mounting in a vehicle and for reproducing an image at least partially generated by a remote source and shown on a display of the remote source, comprising:
    a display interface for providing a signal to an in-vehicle display;
    a communications device for mounting in the vehicle and for communicating with the remote source, the communications device configured to receive the image from the remote source;
    a processing system operatively coupled to the communications device and the display interface, the processing system configured to provide a representation of the image to the display interface; and a memory device communicably coupled to the processing system and including computer code for controlling the communications device so that the representation of the image provided to the display interface is updated to reflect new images generated and shown on the remote source;

wherein the computer code for controlling the communications device includes code to request the new images after a predetermined period of time, wherein the image and the new images are not streamed.

2. The in-vehicle control system of claim 1, wherein the communications device is configured for wireless communications.

3. The in-vehicle control system of claim 1, wherein the received images are duplicates of an image displayed by the remote source.

4. The in-vehicle control system of claim 1, wherein the received images were entirely generated by the remote source.

5. The in-vehicle control system of claim 1, wherein the processing system is configured to conduct a processing task on the image prior to providing the representation to the display interface.

6. The in-vehicle control system of claim 5, wherein the processing task is scaling the image to a different size.

7. The in-vehicle control system of claim 1, wherein the communications device is configured to receive meta information from the remote source and the processing system is configured to process the meta information.

8. The in-vehicle control system of claim 7, wherein the processing system is configured to process the received meta information to perform an output task.

9. The in-vehicle control system of claim 8, wherein output task is a display output task comprising providing information to the display interface.

10. The in-vehicle control system of claim 8, wherein output task is a audio output task comprising providing information to an audio interface, the audio interface configured to provide audio signals to a vehicle audio system.

11. The in-vehicle control system of claim 9, wherein the display output task comprises overlaying information on the representation of the image provided to the display interface.

12. The in-vehicle control system of claim 7, wherein the meta information includes descriptive text and wherein the processing system is configured to parse the descriptive text.

13. The in-vehicle control system of claim 12, wherein the parsed descriptive text may create an output task.

14. The in-vehicle control system of claim 1, further comprising a user input device configured to adjust the image displayed on the in-vehicle display.

15. The in-vehicle control system of claim 1, further comprising a user input device configured to edit a display profile.

16. The in-vehicle control system of claim 1, wherein the memory device is further configured to store at least one profile relating to the display system.

17. The in-vehicle control system of claim 1, wherein the memory device is further configured to store at least one profile relating to the remote source.

18. A method for providing an image to an output display for mounting in a vehicle, comprising:
establishing a communications link with a remote source;
receiving a first image generated by a remote source, wherein the image is a representation of a second image recently displayed on the remote source;
displaying the first image on an output display; and
requesting a new image from the remote source based on a refresh rate variable, wherein the refresh rate variable does not resulting in streaming the first image and the new images.

19. The method of claim 18, further comprising:
storing the first image in a memory device; and
reading the first image from the memory device.

20. The method of claim 18, further comprising processing the first image.

21. The method of claim 18, wherein processing the first image includes adjusting the size of the image based on an attribute of the output display, an area of the output display, or the attribute of the output display and the area of the output display.

22. The method of claim 18, wherein processing the image includes zooming into the image.

23. The method of claim 18, further comprising:
providing a user interface feature and a data feature to the remote source, wherein the user interface feature and the data feature are features of a vehicle control system.

24. The in-vehicle control system of claim 1, wherein the predetermined period of time is based on a refresh rate variable.

* * * * *